US 8,254,394 B1
Aug. 28, 2012

(12) United States Patent
Gummalla et al.

(10) Patent No.: US 8,254,394 B1
(45) Date of Patent: Aug. 28, 2012

(54) TECHNIQUE FOR PROVIDING CONSTANT BIT RATE (CBR) SERVICE OVER A TIME-SLOTTED ACCESS CHANNEL

(75) Inventors: Ajay Chandra Gummalla, Atlanta, GA (US); Sunil Khaunte, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 2063 days.

(21) Appl. No.: 10/788,604

(22) Filed: Feb. 27, 2004

Related U.S. Application Data

(63) Continuation of application No. 09/342,350, filed on Jun. 29, 1999, now abandoned.

(51) Int. Cl.
*H04L 12/56* (2006.01)
(52) U.S. Cl. .................................. 370/395.43
(58) Field of Classification Search .................. None
See application file for complete search history.

(56) References Cited

U.S. PATENT DOCUMENTS

| | | | |
|---|---|---|---|
| 4,926,416 A | 5/1990 | Weik | |
| 5,446,733 A | 8/1995 | Tsuruoka | |
| 5,629,928 A | 5/1997 | Calvignac et al. | |
| 5,638,371 A | 6/1997 | Raychaudhuri et al. | |
| 5,790,538 A | 8/1998 | Sugar | |
| 5,936,949 A * | 8/1999 | Pasternak et al. | 370/328 |
| 5,953,344 A * | 9/1999 | Dail et al. | 370/443 |
| 5,963,541 A | 10/1999 | Koga et al. | |
| 5,995,092 A | 11/1999 | Yuen et al. | |
| 6,081,519 A * | 6/2000 | Petler | 370/356 |
| 6,185,189 B1 | 2/2001 | Brassier et al. | |
| 6,222,844 B1 | 4/2001 | Han et al. | |
| 6,256,315 B1 | 7/2001 | Barbas et al. | |
| 6,298,041 B1 | 10/2001 | Packer | |
| 6,430,158 B1 | 8/2002 | Sugita | |
| 6,438,123 B1 * | 8/2002 | Chapman | 370/351 |

(Continued)

OTHER PUBLICATIONS

U.S. Office Action dated Oct. 8, 2002, U.S. Appl. No. 09/342,350.
U.S. Office Action dated Nov. 18, 2003, U.S. Appl. No. 09/342,350.
U.S. Office Action dated Jun. 28, 2004, U.S. Appl. No. 09/342,350.

*Primary Examiner* — Nittaya Juntima
*Assistant Examiner* — Rhonda Murphy
(74) *Attorney, Agent, or Firm* — Weaver Austin Villeneuve and Sampson LLP

(57) ABSTRACT

According to specific embodiments of the invention, a technique is described for providing constant bit rate (CBR) service over shared access channels in a computer network. The technique of the present invention provides a plurality of linked lists of grant allocation elements at the head end of the network for implementing CBR service to requesting nodes on each shared access channel. Each grant allocation element corresponds to a respective unsolicited CBR grant allocated to a particular node on a selected channel. A CBR service request sent by a particular node to the head end is handled by an admission control engine within the head end. If admission control admits the CBR service request, it inserts one or more unsolicited grant allocation elements relating to the admitted request in at least one of the plurality of linked lists. Each linked list of grant allocation elements is used to generate a CBR portion of a respective, fixed size, grant allocation MAP message. Each grant allocation MAP message includes a first portion of N minislot allocations reserved primarily for CBR purposes, and a second portion of M minislot allocations reserved primarily for non-CBR purposes. Using the technique of the present invention voice traffic or other CBR applications may be supported on shared access channels with delay bound and zero jitter.

30 Claims, 18 Drawing Sheets

U.S. PATENT DOCUMENTS

| | | |
|---|---|---|
| 6,442,149 B1 | 8/2002 | Nakano et al. |
| 6,453,472 B1 * | 9/2002 | Leano et al. ................... 725/111 |
| 6,467,091 B1 * | 10/2002 | Lin et al. ....................... 725/126 |
| 6,577,642 B1 | 6/2003 | Fijolek et al. |
| 6,760,305 B1 * | 7/2004 | Pasternak et al. ............. 370/230 |
| 6,868,072 B1 * | 3/2005 | Lin et al. ....................... 370/276 |
| 6,985,437 B1 * | 1/2006 | Vogel ............................. 370/230 |
| 2007/0109995 A1 * | 5/2007 | Quigley et al. ............... 370/329 |

* cited by examiner

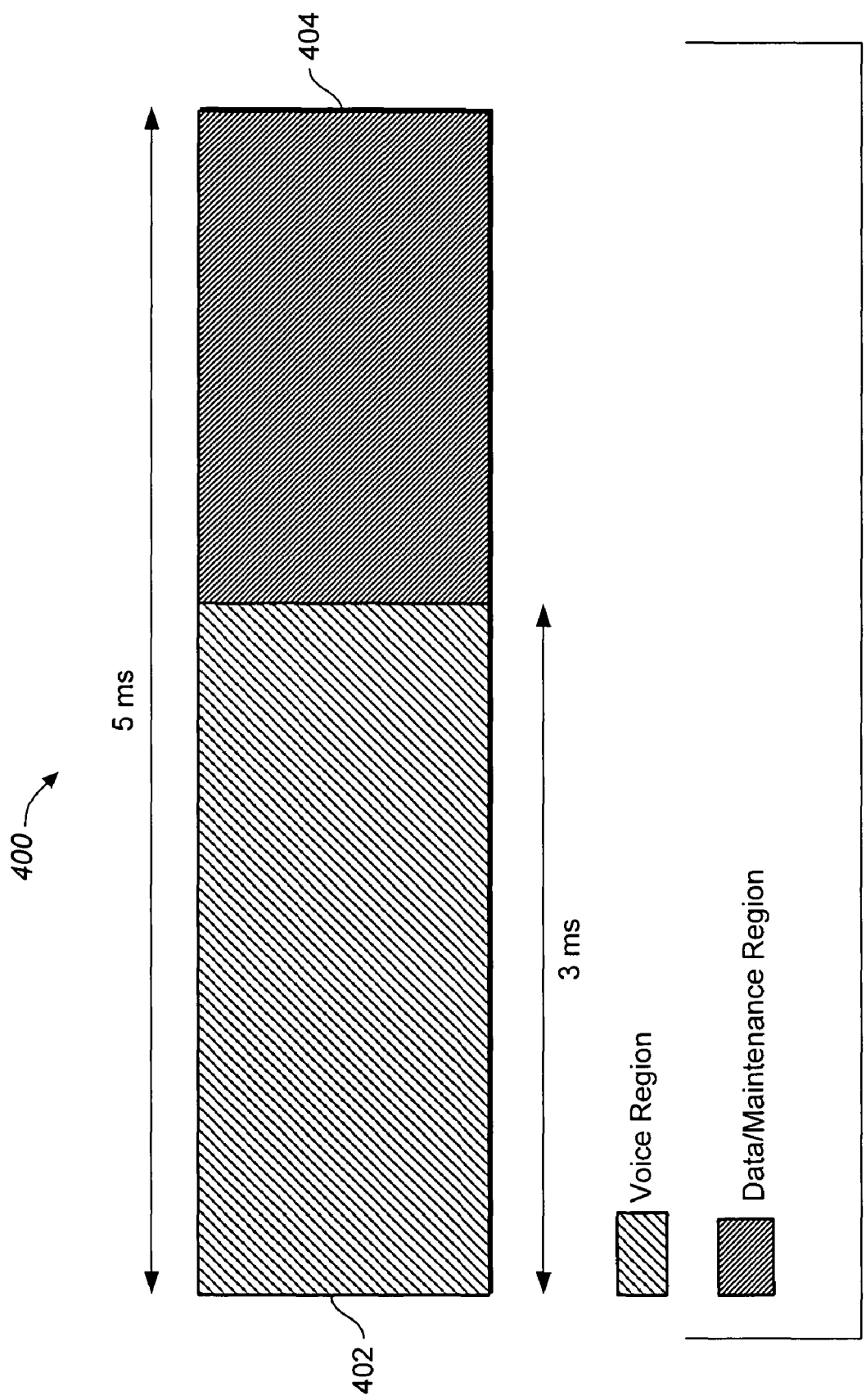

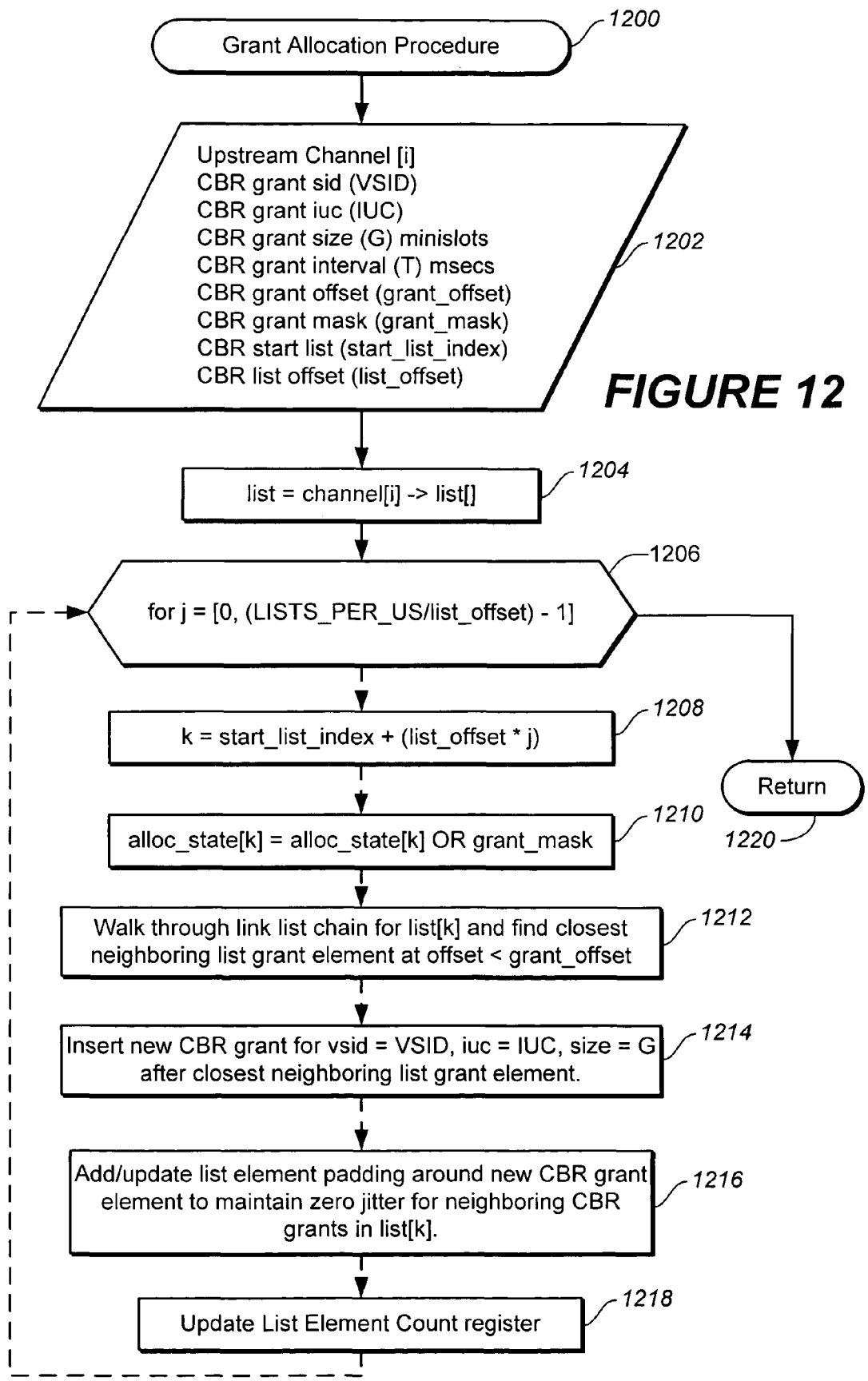

TECHNIQUE FOR PROVIDING CONSTANT BIT RATE (CBR) SERVICE OVER A TIME-SLOTTED ACCESS CHANNEL

CROSS-REFERENCE TO RELATED APPLICATIONS

This application is a continuation of application Ser. No. 09/342,350, filed Jun. 29, 1999, now abandoned wherein the contents is hereby incorporated by reference.

BACKGROUND OF THE INVENTION

1. Field of the Invention

The present invention relates generally to methods and apparatus for transmitting data in a computer network. More specifically, the present invention relates to methods and apparatus for providing constant bit rate (CBR) service over a time-slotted access channel.

2. Background

Broadband access technologies, such as cable, copper, fiber optic, and wireless have made rapid progress in recent years. Recently, there has been a convergence of voice and data networks which is due in-part to the U.S. deregulation of the telecommunications industry. In order to stay competitive, companies offering broadband access technologies need to support voice communication over their local access networks. For networks which use a shared access medium to communicate between subscribers and the service provider (e.g., cable networks, wireless networks, etc.), the support of high quality voice communication over such networks is not an easy task, as described in greater detail below.

One type of shared access network is a cable network or cable modem network, illustrated in FIG. 1 of the drawings.

FIG. 1 is a block diagram of a two-way hybrid fiber-coaxial (HFC) cable system utilizing a cable modem for data transmission. It shows a head end 102 (essentially a distribution hub) which can typically service about 40,000 homes. Head end 102 contains a cable modem termination system (CMTS) 104 that is needed when transmitting and receiving data using cable modems. Block 104 of FIG. 1 represents a cable modem termination system connected to a fiber node 108 by pairs of optical fibers 106. The primary functions of the CMTS are (1) receiving signals from external sources 100 and converting the format of those signals, e.g., microwave signals to electrical signals suitable for transmission over the cable system; (2) providing appropriate Media Access Control (MAC) level packet headers (as specified by the MCNS standard discussed below) for data received by the cable system, (3) modulating and demodulating the data to and from the cable system, and (4) converting the electrical signal in the CMTS to an optical signal for transmission over the optical lines to the fiber nodes.

Head end 102 is connected through pairs of fiber optic lines 106 (one line for each direction) to a series of fiber nodes 108. Each head end can support normally up to 80 fiber nodes. Pre-HFC cable systems used coaxial cables and conventional distribution nodes. Since a single coaxial cable was capable of transmitting data in both directions, one coaxial cable ran between the head end and each distribution node. In addition, because cable modems were not used, the head end of pre-HFC cable systems did not contain a CMTS. Returning to FIG. 1, each of the fiber nodes 108 is connected by a coaxial cable 110 to two-way amplifiers or duplex filters 112 which permit certain frequencies to go in one direction and other frequencies to go in the opposite direction (frequency ranges for upstream and downstream paths are discussed below).

Each fiber node 108 can normally service up to 500 subscribers. Fiber node 108, coaxial cable 110, two-way amplifiers 112, plus distribution amplifiers 114 along trunk line 116, and subscriber taps, i.e. branch lines 118, make up the coaxial distribution system of an HFC system. Subscriber tap 118 is connected to a cable modem 120. Cable modem 120 is, in turn, connected to a subscriber computer 122.

Recently, it has been contemplated that HFC cable systems could be used for two-way transmission of digital data. The data may be Internet data, digital audio, or digital video data, in MPEG format, for example, from one or more external sources 100. Using two-way HFC cable systems for transmitting digital data is attractive for a number of reasons. Most notably, they provide up to a thousand times faster transmission of digital data than is presently possible over telephone lines. However, in order for a two-way cable system to provide digital communications, subscribers must be equipped with cable modems, such as cable modem 120. With respect to Internet data, the public telephone network has been used, for the most part, to access the Internet from remote locations. Through telephone lines, data is typically transmitted at speeds ranging from 2,400 to 33,600 bits per second (bps) using commercial (and widely used) data modems for personal computers. Using a two-way HFC system as shown in FIG. 1 with cable modems, data may be transferred at speeds up to 10 million bps. Table 1 is a comparison of transmission times for transmitting a 500 kilobyte image over the Internet.

TABLE 1

| Time to Transmit a Single 500 kbyte Image | |
|---|---|
| Telephone Modem (28.8 kbps) | 6-8 minutes |
| ISDN Line (64 kbps) | 1-1.5 minutes |
| Cable Modem (30 Mbps) | 1 second |

Furthermore, subscribers can be fully connected twenty-four hours a day to services without interfering with cable television service or phone service. The cable modem, an improvement of a conventional PC data modem, provides this high speed connectivity and is, therefore, instrumental in transforming the cable system into a full service provider of video, voice and data telecommunications services.

As mentioned above, the cable industry has been upgrading its coaxial cable systems to HFC systems that utilize fiber optics to connect head ends to fiber nodes and, in some instances, to also use them in the trunk lines of the coaxial distribution system. In way of background, optical fiber is constructed from thin strands of glass that carry signals longer distances and faster than either coaxial cable or the twisted pair copper wire used by telephone companies. Fiber optic lines allow signals to be carried much greater distances without the use of amplifiers (item 114 of FIG. 1). Amplifiers decrease a cable system's channel capacity, degrade the signal quality, and are susceptible to high maintenance costs. Thus, distribution systems that use fiber optics need fewer amplifiers to maintain better signal quality.

Digital data on the upstream and downstream channels is carried over radio frequency (RF) carrier signals. Cable modems are devices that convert digital data to a modulated RF signal and convert the RF signal back to digital form. The conversion is done at two points: at the subscriber's home by a cable modem and by a CMTS located at the head end. The CMTS converts the digital data to a modulated RF signal which is carried over the fiber and coaxial lines to the subscriber premises. The cable modem then demodulates the RF signal and feeds the digital data to a computer. On the return path, the operations are reversed. The digital data is fed to the cable modem which converts it to a modulated RF signal (it is helpful to keep in mind that the word "modem" is derived from modulator/demodulator). Once the CMTS receives the RF signal, it demodulates it and transmits the digital data to an external source.

Traditionally, voice was supported on telephone networks as a dedicated slot allocation in a circuit-switched connection. Such connections provide a dedicated channel for the entire duration of the call. However, this results in under-utilization of network resources. More recently, voice information may be transmitted across the cable network in a manner similar to that used for transmitting data across the cable network. Voice is being supported over IP on packet-switched networks where the voice is digitized, packetized, and shipped as IP frames over data networks. This results in higher utilization of bandwidth at the cost of delay and jitter experienced as these packets traverse through the data networks. There are a number of conventional standards for digitizing analog voice data, each trading efficiency, bandwidth, processing power, and quality. Such standards are commonly known to those skilled in the art.

One important difference between data communication and voice communication over digital computer networks is that voice service demands much more stringent standards for acceptable voice quality, particularly with respect to delay and jitter tolerances. Typically, most delay may be compensated for by buffering. However, for supporting toll quality voice, little or no jitter can be tolerated, particularly in the local access portion of the end-to-end Voice Over IP (VoIP) network. It is to be noted that, henceforth, the term "voice" refers to packetized voice data having stringent delay and jitter restrictions. A voice source can be abstracted as a source which generates constant size packets at a specific rate. Due to the range of standards that exist in the telecommunication industry today, a wide range of packet sizes and rates need to be supported by the cable network.

Shared Access Problems

In a HFC network, data is transferred by a request-grant mechanism. In order for a cable modem to transmit data to the Head End (CMTS), it must first send a data transmission request signal to the CMTS, informing the CMTS that it has data to send. The CMTS, on receiving a request from a cable modem, allocates one or more time slots on the upstream channel for that particular cable modem to send its data.

An upstream channel MAC scheduler, which is part of the CMTS, plays an important role in dictating remotely to the cable modems (via channel MAP messages) the predetermined use of time-slot assignments on the upstream channel. This scheduler works with several MAC/PHY/QoS constraints. A typical sequence of events for transferring data over a CATV system would be as follows:

(1) If the cable modem has data to transmit, it will send a time slot request to the CMTS.
(2) If the request reaches the CMTS successfully, it is queued depending upon the priority of the request. Otherwise, the cable modem retransmits its request after waiting a random amount of time.
(3) The CMTS will then allocate a time slice for this modem after satisfying all other higher priority requests and constraints.
(4) The cable modem, on receiving the grant transmits its data during its allotted time slice.

This request-grant mechanism, though ideal for bursty traffic, is not acceptable for meeting toll quality voice requirements. For example, using the request-grant mechanism, delay and jitter become a function of other stations on the network, as well as a function of the load on the system. Additionally, the potential for large access delay jitter to the CMTS makes this scheme undesirable for real-time voice service. Further, the potential for jitter is also increased due to the fact that variable-length packets are supported by the CMTS.

While conventional data communication techniques for broadband access technologies are able to provide a minimum level of acceptable service quality for some of today's applications, there exists a continual need to improve data communication techniques for broadband access technologies so as to provide better quality service for supporting current and future applications which may include high-bandwidth applications such as voice, fax, video, etc.

SUMMARY OF THE INVENTION

According to specific embodiments of the invention, a technique is described for providing constant bit rate (CBR) service over shared access channels in a computer network. More specifically, the present invention describes admission control and scheduling techniques to support voice traffic (or other CBR applications) on shared access channels with delay bound and zero jitter. Additionally, the present invention provides a technique for supporting voice traffic with different encoding techniques and packetization delays. Further, the technique of the present invention provides a fast search algorithm for admission control of constant bit rate service traffic such as voice, video, etc. The technique of the present invention increases resource utilization by reusing bandwidth when a call is detected to be idle. Additionally, the technique of the present invention is easily implemented and compatible with conventional request-grant protocols commonly implemented in cable modem networks or other networks utilizing shared access channels of data communication.

According to a specific embodiment of the invention, a method is described for providing constant bit rate (CBR) service over a computer network. The network includes a Head End and a plurality of nodes. The method comprises receiving a CBR service request from a node on a particular upstream channel, the CBR service request comprising a request to periodically transmit to the Head End a packet of p-bytes every t-milliseconds. The method also includes evaluating whether the CBR service request can be admitted. In response to a determination that the CBR service request can be admitted, a plurality of unsolicited grants are allocated for the node at predetermined, constant, periodic intervals, to thereby provide CBR service to the node.

A second specific embodiment of the present invention provides a method for implementing a plurality of unsolicited grants in response to at least one constant bit rate (CBR) service request from at least one node of a computer network. The network includes a Head End and plurality of nodes. The method comprises providing at least one linked list of CBR grant allocation elements. Each linked list includes one or more grant allocation elements. Each of the CBR grant allocation elements corresponds to a respective unsolicited CBR grant which has been allocated to a particular node on a selected channel. The method further includes using the plurality of CBR grant allocation elements in at least one linked list to generate at least a portion of a respective grant allocation MAP message at constant, periodic intervals, wherein the plurality of CBR grant allocation elements are converted to respective unsolicited CBR minislot grant allocations in the respective MAP message.

A third specific embodiment of the present invention provides a method for implementing a plurality of unsolicited grants in response to at least one constant bit-rate (CBR) service request from at least one node of a computer network. The method comprises scheduling a plurality of CBR grant allocations for servicing CBR requests from nodes on a particular upstream channel; and providing a plurality of grant allocation MAP messages to nodes on the upstream channel at constant, periodic intervals. Each MAP message corresponds to a first predetermined number N of minislot allocations reserved primarily for CBR purposes, and a second predetermined number M of minislot allocations reserved primarily for non-CBR purposes.

A fourth specific embodiment of the present invention describes a method for providing constant bit-rate (CBR) service over a computer network. The method comprises receiving a CBR service request from a node on a particular upstream channel of the network, the CBR service request including request parameters to periodically transmit a packet of p bytes every t milliseconds; and computing, based upon the request parameters, a grant time interval T and a grant size G for the CBR service request. The grant size value represents a number of G minislots to be allocated every T milliseconds to accommodate the CBR service request. The method further includes consulting at least one selected list of a plurality of linked lists of CBR grant allocation elements to determine if the grant size of G minislots can be allocated every T milliseconds on the upstream channel. Each CBR grant allocation element in each of the linked lists corresponds to a respective unsolicited CBR grant which has been allocated to a particular node on the upstream channel. If it is determined that the grant size of G minislots can be allocated every T milliseconds on the upstream channel, at least one new CBR grant allocation element is inserted into at least one of the selected lists of the plurality of linked lists. This new CBR grant element represents a plurality of fixed, unsolicited grants allocated for servicing the CBR service request.

A fifth specific embodiment of the present invention is directed to a system for providing constant bit-rate service over a computer network. The network includes a head end and a plurality of nodes. The network further includes at least one shared-access upstream channel utilized by at least a portion of the plurality of nodes to communicate with the head end. The network also includes at least one downstream channel used by the head end to communicate with the portion of nodes. The system comprises an Access Control System (ACS) in communication with the head end for coordinating node access to the head end, the ACS having memory and at least one processor. The memory is configured or designed to include at least one linked list of CBR grant allocation elements for each upstream channel in the network. The linked list includes a plurality of CBR grant allocation elements, wherein each of the CBR grant allocation elements corresponds to a respective unsolicited CBR grant allocated to a particular node on a selected channel.

A sixth specific embodiment of the present invention is directed to a system for providing constant bit-rate service over a computer network. The network includes a head end and a plurality of nodes. The network further includes at least one shared-access upstream channel utilized by at least a portion of the nodes to communicate with the head end and at least one downstream channel utilized by the head end to communicate with the portion of nodes. The system comprises an access control system (ACS) in communication with the head end for coordinating node access to the head end, the ACS having memory and at least one processor. The ACS is configured or designed to generate a plurality of grant allocation MAP messages to nodes on a selected channel at constant, periodic intervals. Each MAP message corresponds to a first predetermined number N of minislot allocations reserved primarily for CBR purposes, and a second predetermined number M of minislot allocations reserved primarily for other purposes including maintenance, contention, and data grant purposes.

A seventh specific embodiment of the present invention is directed to a system for providing constant bit-rate service over a computer network. The network includes a head end and a plurality of nodes. The network further includes at least one upstream channel utilized by at least a portion of the nodes to communicate with the head end and at least one downstream channel utilized by the head end to communicate with the portion of nodes. The system comprises an access control system (ACS) in communication with the head end for coordinating node access to the head end, the ACS having memory and at least one processor. The ACS is configured or designed to receive a CBR service request from a node on a particular upstream channel. The CBR service request comprises a request to periodically transmit a packet of p-bytes every t-milliseconds. The ACS is further configured or designed to evaluate whether the CBR service request can be admitted. The ACS is further configured or designed to allocate a plurality of unsolicited grants for the requesting node at predetermined, constant, periodic intervals, in response to a determination that the CBR service request can be admitted, to thereby provide CBR service to the requesting node.

An eighth specific embodiment of the present invention is directed to a system for providing constant bit-rate service over a computer network. The network includes a head end and a plurality of nodes. The network further includes at least one shared-access upstream channel utilized by at least a portion of the nodes to communicate with the head end and at least one downstream channel utilized by the head end to communicate with the portion of nodes. The system comprises an access control system (ACS) in communication with the head end for coordinating node access to the head end, the ACS having memory and at least one processor. The ACS is configured or designed to generate channel MAP messages to nodes on at least one channel of the network. The ACS includes a plurality of linked lists of CBR grant elements wherein each of the CBR grant allocation elements in each of the lists corresponds to a respective unsolicited CBR grant allocated to a particular node on a selected upstream channel.

A ninth specific embodiment of the present invention is directed to a computer program product for providing constant bit-rate service over a computer network. The computer program product comprises a computer useable medium having computer readable code embodied therein. The computer readable code comprises computer code for receiving a CBR request from a node on a particular upstream channel; computer code for evaluating whether the CBR service request can be admitted; and computer code for allocating a plurality of unsolicited grants for the node at predetermined, constant, periodic intervals, in response to a determination that the CBR service request can be admitted, to thereby provide CBR service to the requesting node. If the CBR service request is admitted and scheduled, the requesting node is then able to send or transmit a packet of p-bytes to its target destination every t-milliseconds.

A tenth specific embodiment of the present invention is directed to a computer program product for implementing a plurality of unsolicited grants in response to at least one constant bit-rate service request from at least one node in a computer network. The computer program product comprises a computer useable medium having computer readable code embodied therein. The computer readable code comprises computer code for providing at least one linked list of CBR grant allocation elements, the linked list including a plurality of CBR grant allocation elements, wherein each of the CBR grant allocation elements corresponds to a respective unsolicited CBR grant allocated to a particular node on a selected channel of the network. The computer readable code further comprises computer code for using the plurality of CBR grant allocation elements in the at least one linked list to generate at least a portion of a respective grant allocation MAP message at constant, periodic intervals, wherein the plurality of CBR grant allocation elements are converted to respective unsolicited CBR minislot grant allocations in the respective MAP message.

An eleventh specific embodiment of the present invention is directed to a computer program product for implementing a plurality of unsolicited grants in response to at least one constant bit-rate service request from at least one node in a computer network. The computer program product comprises a computer useable medium having computer readable code embodied therein. The computer readable code comprises computer code for scheduling a plurality of CBR grant allocations for servicing CBR service requests from nodes on a particular upstream channel of the network; and computer code for providing a plurality of grant allocation MAP messages to nodes on the upstream channel at constant, periodic intervals, wherein each MAP message corresponds to a first predetermined number N of minislot allocations reserved primarily for CBR purposes, and a second predetermined number M of minislot allocations reserved for non-CBR purposes.

A twelfth specific embodiment of the present invention is directed to a computer program product for providing constant bit-rate service over a computer network. The computer program product comprises a computer useable medium having computer readable code embodied therein. The computer readable code comprises computer code for receiving a CBR service request from a node on a particular upstream channel, the CBR service request including request parameters to periodically transmit a packet of p-bytes every t-milliseconds. The computer readable code further comprises computer code for computing, based upon the request parameters, a grant time interval T and a grant size G for the CBR service request, the grant size value representing a number of G-minislots to be allocated every T-milliseconds to accommodate the CBR service request. The computer readable code also comprises computer code for consulting at least one selected list of a plurality of linked lists of CBR grant allocation elements to determine if the grant size of G-minislots can be allocated every T-milliseconds on the upstream channel; and computer code for inserting at least one new CBR grant allocation element into at least one selected list of said plurality of linked lists, if it is determined that the grant size of G-minislots can be allocated every T-milliseconds on the upstream channel. This new CBR grant element represents a plurality of fixed, unsolicited grants which are allocated for servicing the CBR service request.

Additional objects, features and advantages of the various aspects of the present invention will become apparent from the following description of the preferred embodiments, which description should be taken in conjunction with the accompanying drawings.

BRIEF DESCRIPTION OF THE DRAWINGS

FIG. 4 shows a specific embodiment of a channel MAP message 400 in accordance with the technique of the present invention.

FIG. 12 shows a flow diagram of a CBR Grant Allocation procedure in accordance with a specific embodiment of the present invention.

DETAILED DESCRIPTION OF THE PREFERRED EMBODIMENT

Figure 2A:
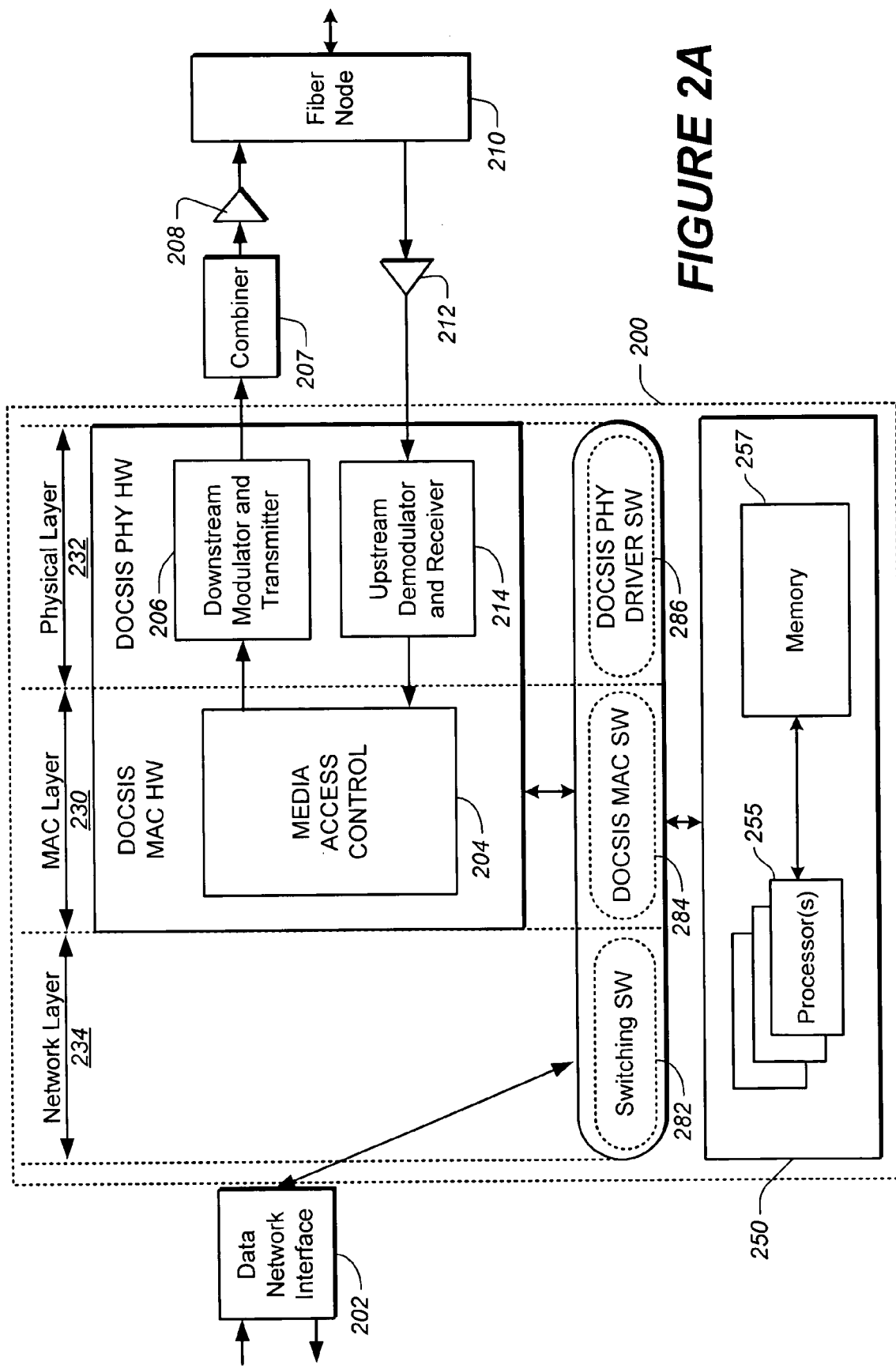
FIG. 2A shows a schematic block diagram of a Cable Modem Termination System (CMTS) implemented as part of the head end of a cable network.

FIG. 2A provides a schematic block diagram illustrating the basic components of a Cable Modem Termination System (CMTS), represented by block 200. In a specific embodiment as shown, for example, in FIG. 2A, the CMTS implements three protocol layers, including a physical layer 232, a Media Access Control (MAC) layer 230, and a network layer 234. When a modem sends a packet of information (e.g. data packet, voice packet, etc.) to the CMTS, the packet is received at fiber node 210. Each fiber node 210 can generally service about 500 subscribers, depending on bandwidth. Converter 212 converts optical signals transmitted by fiber node 210 into electrical signals that can be processed by upstream demodulator and receiver 214. The upstream demodulator and receiver 214 is part of the CMTS physical layer 232. Generally, the physical layer is responsible for receiving and transmitting RF signals on the HFC cable plant. Hardware portions of the physical layer include downstream modulator and transmitter 206 and upstream demodulator and receiver 214. The physical layer also includes device driver software 286 for driving the hardware components of the physical layer.

Once an information packet is demodulated by the demodulator/receiver 214, it is then passed to MAC layer 230. A primary purpose of MAC layer 230 is to coordinate channel access of multiple cable modems sharing the same cable channel. The MAC layer 230 is also responsible for encapsulating and de-encapsulating packets within a MAC header according to the DOCSIS standard for transmission of data or other information. This standard is currently a draft recommendation (J.isc Annex B) which has been publicly presented to Study Group 9 of the ITU in October 1997, and is known to a person in the cable modem data communication field.

MAC layer 230 includes a MAC hardware portion 204 and a MAC software portion 284, which function together to encapsulate information packets with the appropriate MAC address of the cable modem(s) on the system. Note that there are MAC addresses in the cable modems which encapsulate data or other information to be sent upstream with a header containing the MAC address of the hub associated with the particular cable modem sending the data.

Each cable modem on the system has its own MAC address. Whenever a new cable modem is installed, its address is registered with MAC layer 230. The MAC address is important for distinguishing data sent from individual cable modems to the CMTS. Since all modems on a particular channel share a common upstream path, the CMTS 200 uses the MAC address to identify and communicate with a particular modem on a selected upstream channel. Thus, data packets, regardless of format, are mapped to a particular MAC address. MAC layer 230 is also responsible for sending out polling messages as part of the link protocol between the CMTS and each of the cable modems on a particular channel. These polling messages are important for maintaining a communication connection between the CMTS and the cable modems.

After the upstream information has been processed by MAC layer 230, it is then passed to network layer 234. Network layer 234 includes switching software 282 for causing the upstream information packet to be switched to an appropriate data network interface on data network interface 202.

When a packet is received at the data network interface 202 from an external source, the switching software within network layer 234 passes the packet to MAC layer 230. MAC block 204 transmits information via a one-way communication medium to a downstream modulator and transmitter 206. Downstream modulator and transmitter 206 takes the data (or other information) in a packet structure and modulates it on the downstream carrier using, for example, QAM 64/256 modulation (other methods of modulation can be used such as CDMA {Code Division Multiple Access} OFDM {Orthogonal Frequency Division Multiplexing}, FSK {FREQ Shift Keying}). The return data is likewise modulated using, for example, QAM 16 or QSPK. These modulations methods are well-known in the art.

Downstream Modulator and Transmitter 206 converts the digital packets to modulated downstream RF frames, such as, for example, MPEG or ATM frames. Data from other services (e.g. television) is added at a combiner 207. Converter 208 converts the modulated RF electrical signals to optical signals that can be received and transmitted by a Fiber Node 210 to the cable modem hub.

It is to be noted that alternate embodiments of the CMTS (not shown) may not include network layer 234. In such embodiments, a CMTS device may include only a physical layer and a MAC layer, which are responsible for modifying a packet according to the appropriate standard for transmission of information over a cable modem network. The network layer 234 of these alternate embodiments of CMTS devices may be included, for example, as part of a conventional router for a packet-switched network.

Figure 1:
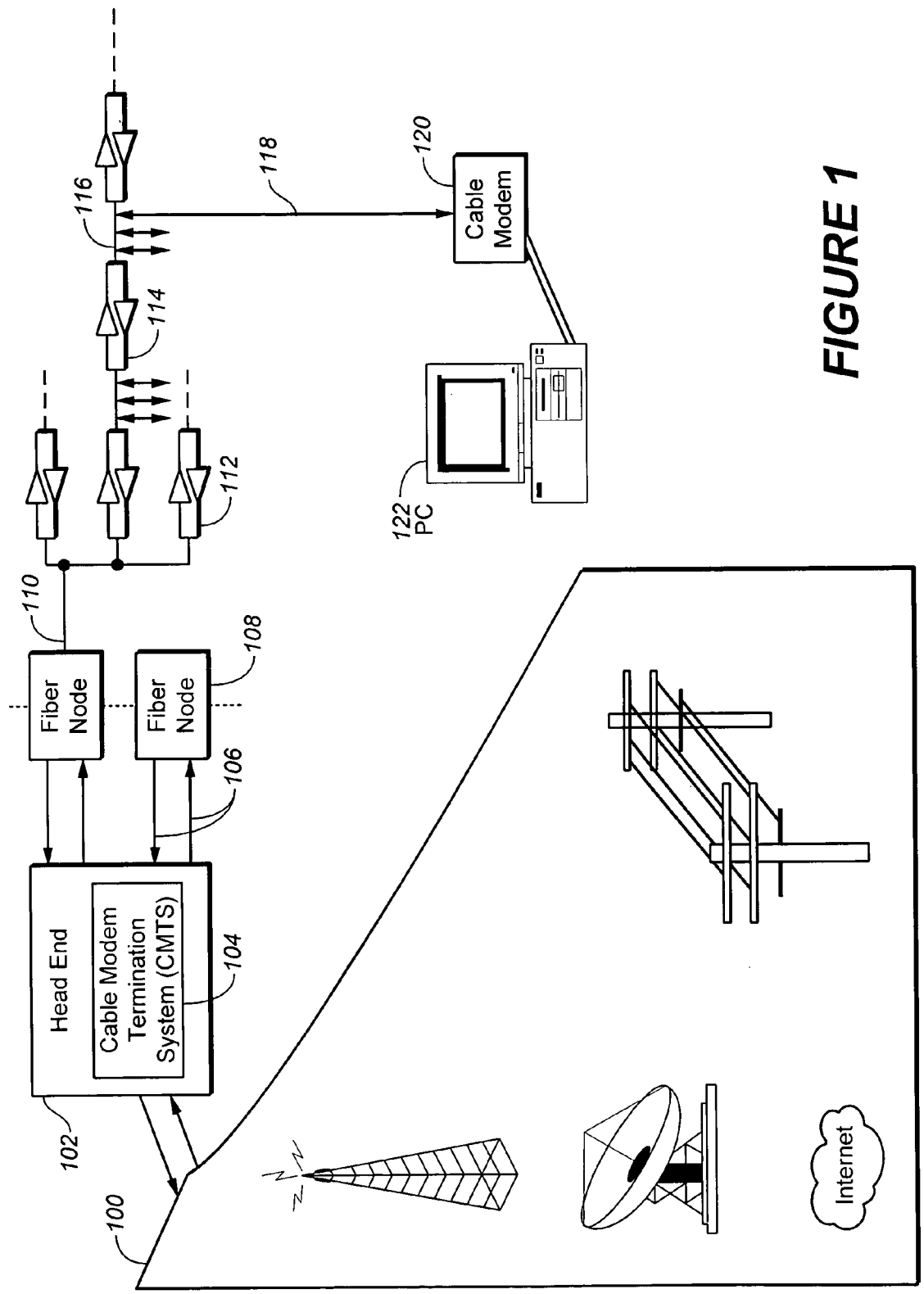
FIG. 1 shows a block diagram of a two-way Hybrid Fiber-Coaxial (HFC) cable network utilizing a cable modem for data transmission.

In a specific embodiment, the network layer of the CMTS is configured as a cable line card coupled to a standard router that includes the physical layer 232 and MAC layer 230. Using this type of configuration, the CMTS is able to send and/or receive IP packets to and from the data network interface 202 using switching software block 282. The data network interface 202 is an interface component between external data sources and the cable system. The external data sources (item 100 of FIG. 1) transmit data to the data network interface 202 via, for example, optical fiber, microwave link, satellite link, or through various media. The data network interface includes hardware and software for interfacing to various networks such as, for example, Ethernet, ATM, frame relay, etc.

As shown in FIG. 2A, CMTS 200 also includes a hardware block 250 which interacts with the software and other hardware portions of the various layers within the CMTS. Block 250 includes one or more processors 255 and memory 257. The memory 257 may include, for example, I/O memory (e.g. buffers), program memory. Hardware block 250 may physically reside with the other CMTS components, or may reside in a machine or other system external to the CMTS. For example, the hardware block 250 may be configured as part of a router which includes a cable line card.

Figure 2B:
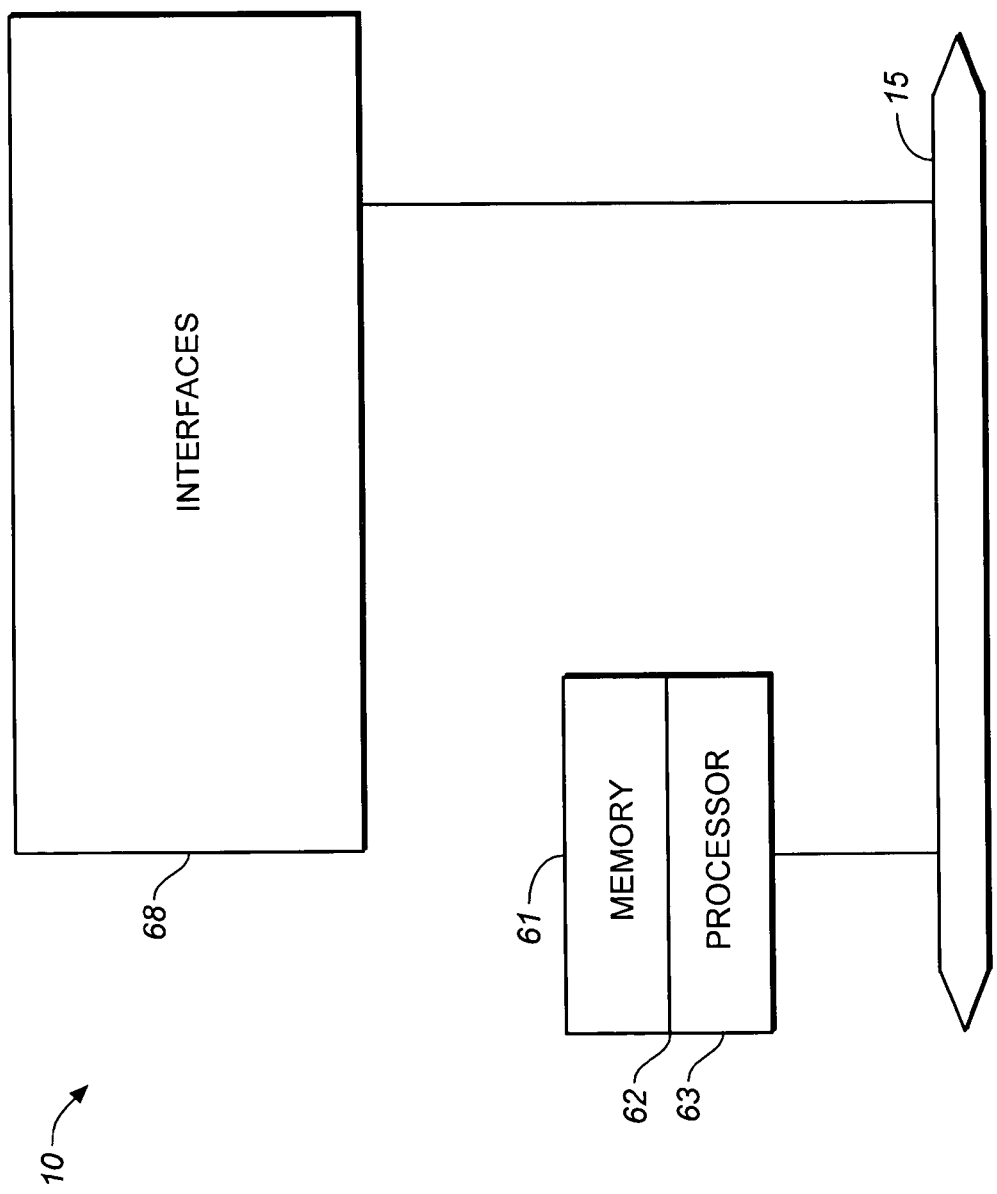
FIG. 2B shows a schematic block diagram of a router which may be used to implement the technique of the present invention.
Figure 2C:
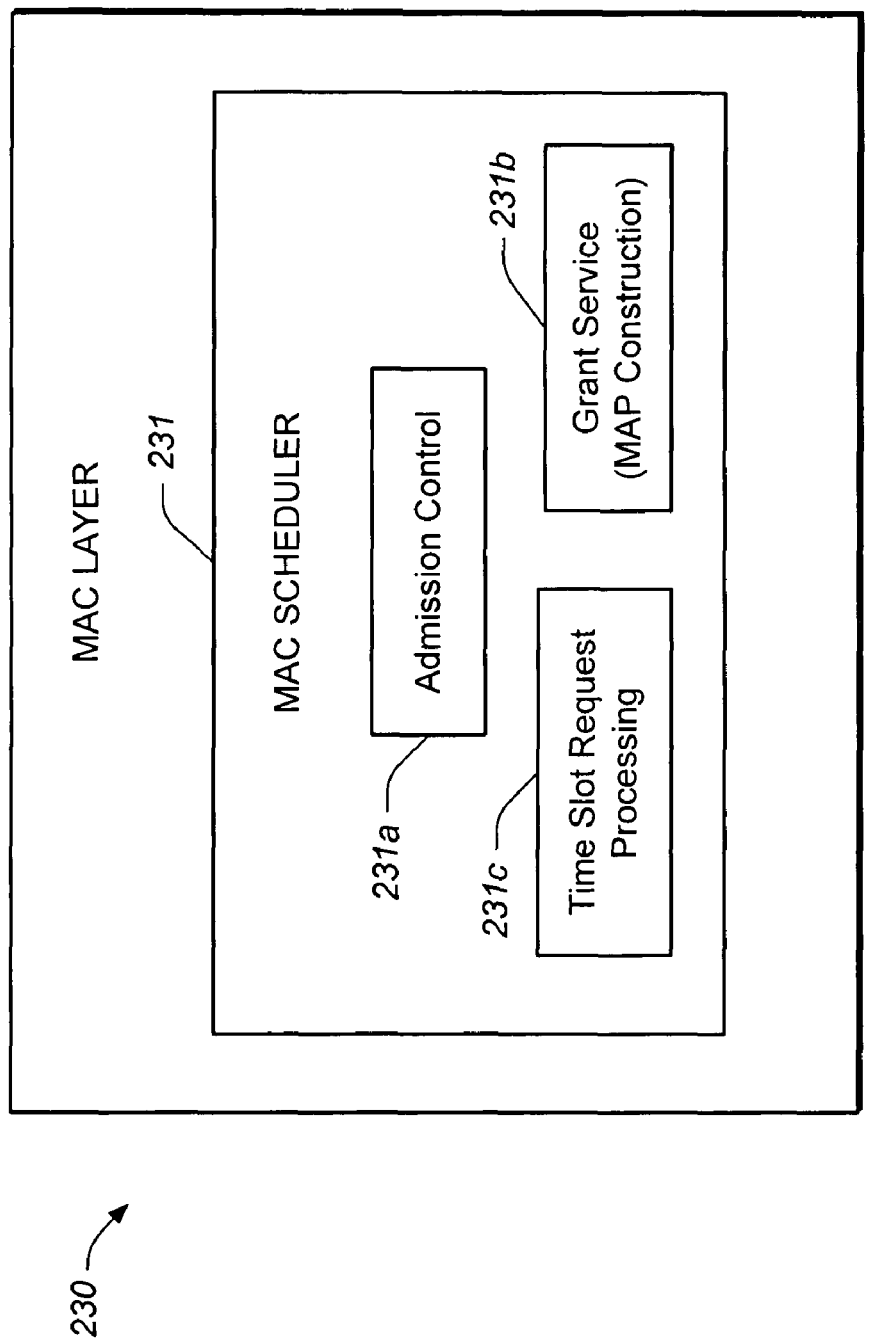
FIG. 2C shows a schematic block diagram of MAC layer 230 of FIG. 2A.

FIG. 2C shows a schematic block diagram of MAC layer 230 of FIG. 2A. MAC layer 230 includes a MAC scheduler 231 which is responsible for controlling the number, order, and timing of the various minislot allocation types on each upstream channel. This responsibility includes handling Admission Control procedures for modems requesting quality of service (QoS) on the cable access channel. As shown in FIG. 2C, the MAC scheduler includes an admission control block 231*a*, a grant service or MAP construction block 231*b*, and a time slot request processing block 231*c*.

Generally, the unsolicited grant (UGS) servicing technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in platform-specific software of a network operating system or in an application running on an operating system.

A software or software/hardware hybrid UGS servicing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the UGS servicing systems of this invention may be specially configured routers (such as, for example, specially configured router models 1600, 2500, 2600, 3600, 4500, 4700, 7200, 7500, and 12000, available from Cisco Systems, Inc. of San Jose, Calif.) which have been adapted to interface with cable networks. A general architecture for some of these machines will appear from the description given below. In an alternative embodiment, the UGS servicing system may be implemented on a general-purpose network host machine such as a personal computer or workstation adapted to interface with computer networks. Further, as described previously, the invention may be at least partially implemented on a card (e.g., a cable line card) for a network device or a general-purpose computing device.

Referring now to FIG. 2B, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for admission control of UGS or constant bit rate (CBR) service requests, scheduling of UGS or CBR service, generating channel MAP messages, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 2B is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 61) configured to store, for example, program instructions for the general-purpose network operations and other instructions specific to the constant bit rate (CBR) servicing technique of the present invention described herein. The program instructions may control the operation of an operating system and/or one or more applications, for example. The memory or memories may also be configured to store information specific to the constant bit rate (CBR) servicing technique of the present invention described herein, such as, for example, information relating to one or more linked lists of CBR grant allocation elements, ALLOC_STATE information, ALLOC_VACANCY information, GRANT_MAP information, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

As stated previously, a router which has been configured to implement the functions of a CMTS in a cable network will include the necessary hardware and/or software components for performing basic data connectivity on the cable network. Typically, such data connectivity involves communication via an upstream channel (for carrying signals from a group of cable modem to the cable head-end) and a downstream channel (for carrying signals from the head-end to the group of cable modems). A cable access network typically comprises multiple upstream channels and multiple downstream channels.

Protocols that enable high-speed data access over cable modem networks typically employ a shared time-slotted access scheme for the upstream channel. Whenever a cable modem wishes to send data upstream, it first sends a time slot request to the head end, clearly specifying the size of the time-slice it needs to send the data packet. The head end then schedules a data grant for this cable modem at some later time on the upstream channel.

On the downstream cable data channel, data is broadcast by a single head-end (CMTS) to cable modems served on that downstream channel. However, the upstream channel is complicated by the fact that it is used as a multiple access channel which is shared by the large group of cable modems (on that channel) to communicate with the CMTS. The upstream channel is time-slotted and cable modems need to contend for gaining access to the CMTS in this shared channel.

As mentioned previously, each DOCSIS upstream cable channel is a time-slotted multiple-access type channel. The basic unit of scheduling is a minislot. The CMTS remotely schedules each and every minislot on the upstream channel. Contiguous minislots may be grouped together to form a larger time slot for variable length data. Some contiguous minislots are grouped together as a unicast data slot meant to be used by a specific cable modem for sending its data upstream. Some minislots are marked as contention slots that can be used by any cable modem to send ranging/time slot requests upstream to the CMTS. The CMTS conveys this minislot allocation information (to the set of modems sharing the upstream channel) ahead of time using bandwidth allocation MAP messages which are periodically broadcast on the downstream channel. In general any given upstream channel [i] includes two logical sub-channels: a contention sub-channel comprising contention minislots which can be used by any cable modem, and a reservation or grant sub-channel comprising minislots allocated to specific cable modems. This is shown, for example, in FIG. 3 of the drawings.

For simplification purposes, and to avoid confusion, the "[i]" portion of the upstream or downstream channel and/or elements related thereto may not be included in parts of the discussion below. It is to be understood, however, that the techniques described herein with respect to a particular channel may also be applied to other channels in the network.

FIG. 3 shows an example of various minislot allocation types, which are implemented on a shared-access upstream channel utilized by a group of cable modems to communicate with the CMTS. FIGS. 3B, 3C, and 3D illustrate various sub-channels which form part of the upstream channel 300 of FIG. 3A.

Figure 3A:
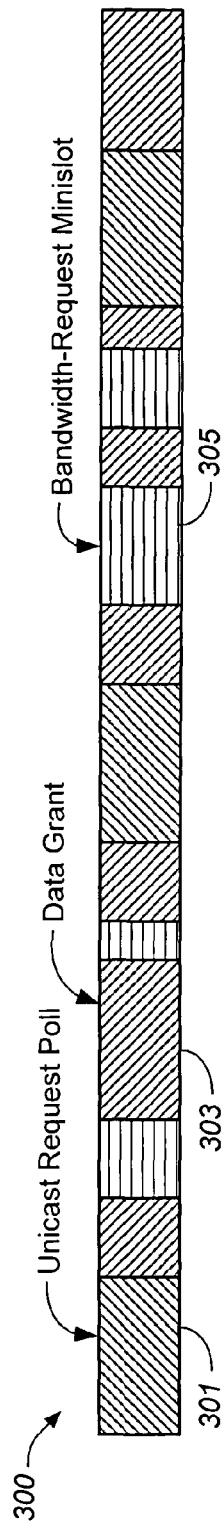
FIG. 3A shows an example of various minislot allocation types implemented on a shared-access upstream channel which provides a communication link between cable modems in the network and the CMTS.
Figure 3B:
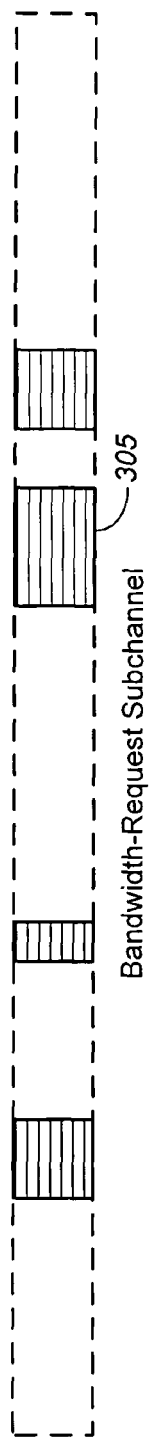
FIGS. 3B, 3C and 3D illustrate various sub-channels which form part of the upstream channel 300 of FIG. 3A.
Figure 3C:
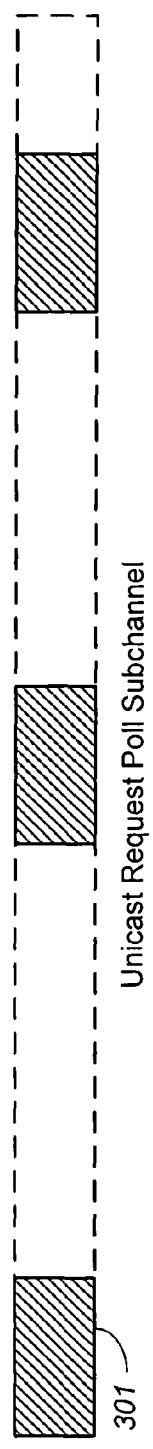

As Shown in FIG. 3A, each upstream channel 300 includes a plurality of different minislot allocation types. These various minislot allocation types include, for example, initial maintenance slots, periodic maintenance slots, broadcast request minislots, unicast request polls, data grant slots, and request-data slots.

As shown in FIG. 3A, the CMTS marks some of the upstream minislots on channel 300 as contention-based bandwidth-request minislots, illustrated, for example, by slot 305 of FIG. 3A. Any cable modem having upstream data to send, can/will use this type of minislot to request the CMTS for a subsequent data grant minislot (303, FIG. 3A), whereby a cable modem may then transmit its data to the CMTS in non-contention mode. A bandwidth-request subchannel of upstream channel 300 is shown, for example, in FIG. 3B.

Figure 3D:
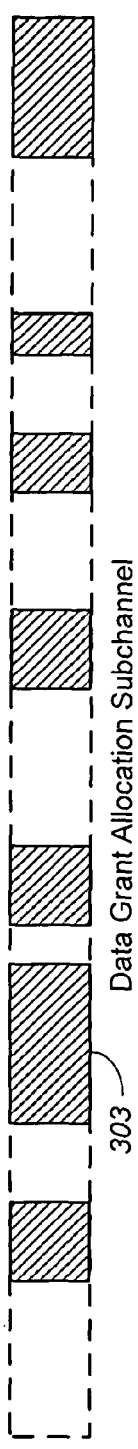

When the CMTS receives a time slot request for a data grant by a particular cable modem, the CMTS responds by issuing one or more data grant minislots to the requesting cable modem. The data grant minislot 303 (FIG. 3A) is a unicast-type time-based slot which is utilized by a specified cable modem to transmit data upstream to the CMTS in non-contention mode. The data grant allocation sub-channel of upstream channel 300 is shown in FIG. 3D.

Another type of minislot which may be allocated on channel 300 of FIG. 3A is a unicast request poll minislot 301. This type of minislot is used by specific cable modems having delay/delayed-jitter sensitive application traffic (e.g. voice/video) that cannot afford to contend with the plurality of other cable modems in the network during the time slot request phase. For these special cable modems, the MAC scheduler periodically provides unicast request poll minislots soliciting time slot requests from only these "delay sensitive" cable modems. Thus, the unicast request poll feature serves as a dedicated in-band request sub channel for cable modems transmitting delay sensitive information. A unicast request poll sub channel is shown, for example, in FIG. 3B of the drawings.

The MAC scheduler is responsible for controlling the number, order, and timing of the various minislot allocation types on each upstream channel within the cable modem network. More specifically the MAC scheduler is responsible for remotely scheduling different types of time-slots on the upstream channel, and conveying the information relating to the time-slot type/ownership to the cable modems on that channel ahead of time using downstream MAP MAC messages. For example, the MAC scheduler is responsible for allocating initial maintenance slots (broadcast-type time-slots for new cable modems to come up and join the network); periodic maintenance slots (unicast-type time-slots for an already registered cable modem to perform periodic ranging); bandwidth-request slots (broadcast-type time-slots for cable modems to signal outstanding data to be transmitted upstream); data grant slots (unicast-type time-slots for specific cable modems to transmit data upstream), etc. To support CBR or unsolicited grant service in this frame work imposes some constraints on how channel MAPs are built, and how different types of grant regions are scheduled.

In conventional cable modem networks, channel MAPs are built by the MAC scheduler approximately every 2 milliseconds. The map building code allocates grants according to specific rules, until the size of the MAP is greater than or equal to 2 milliseconds. However, because each grant may be of variable length, it is possible to have a map greater than 2 milliseconds. For example, if the last grant is a maximum size grant, it can make the MAP size grow from 2 milliseconds to 7.5 milliseconds. These figures may also differ depending upon the upstream data rate. Additionally, maintenance constraints require that the channel MAP be at least 2 milliseconds long in order to accommodate initial maintenance slots which are 2 milliseconds in length and need to be synchronized across all the upstream channels after an initial maintenance flag has been set.

In order to support voice or other CBR-type services in the cable modem network, one aspect of the present invention is directed to a modified channel MAP message format which is compatible with the above-described constraints in conventional cable modem networks. An example of the modified channel MAP message in accordance with the technique of the present invention is shown in FIG. 4 of the drawings.

FIG. 4 shows a specific embodiment of a channel MAP message format 400 implemented in accordance with the technique of the present invention. In the specific embodiment of FIG. 4, the channel MAP 400 is implemented having a fixed size of 5 milliseconds, wherein a 3 millisecond portion 402 of the MAP corresponds to minislots allocated primarily for CBR purposes, and a 2 millisecond portion 404 of the MAP 400 corresponds to minislots which have been allocated for other purposes such as, for example, non-CBR data grants, periodic ranging, initial maintenance, etc.

Although not shown in FIG. 4, portion 402 of MAP 400 comprises a plurality of N minislot allocations reserved primarily for CBR grant purposes. Minislots within portion 402 which are not used for CBR purposes may be reused for other purpose such as data, request, and/or maintenance regions. In a specific embodiment of the present invention, each minislot occupies a time length of 50 microseconds. Thus, according to this embodiment, portion 402 will include 60 minislot allocations which, together, have a total time length of 3 milliseconds.

Portion 404 of MAP 400 includes a plurality of M minislot allocations reserved primarily for non-CBR purposes. In the specific embodiment where the size of each minislot unit is equal to 50 microseconds, portion 404 will include 40 minislot allocations, which have a total combined length of 2 milliseconds.

It is preferable that each channel MAP be of fixed size. In the embodiment of FIG. 4, this fixed size is 5 milliseconds. In order to ensure that each channel MAP remains a fixed size, it is preferable that fragmentation be supported by the various networks elements. For example, if the last grant in a channel MAP message is a maximum size grant, this last grant would need to be fragmented so that it does not increase the size of the map beyond the desired fixed size.

It will be appreciated that the particular size of the MAP message implemented for a particular network may vary, depending upon the specific perimeters of the network. For example, a MAP size of 4 milliseconds may be used, where 2 milliseconds corresponds to the CBR portion of the MAP, and 2 milliseconds corresponds to the non-CBR portion of the MAP. The size of the MAP should preferably be greater than 2 milliseconds in order to satisfy requirements relating to the compulsory initial maintenance regions (described above) implemented by conventional cable modem networks.

However, in other networks where the 2 millisecond initial maintenance slot region is not a constraining factor, a channel MAP message format may be provided in accordance with the technique of the present invention whereby a first portion of N minislot allocations in the MAP message are reserved primarily for CBR purposes (e.g. CBR grants), and a second predetermined number of M minislot allocations are reserved primarily for non-CBR purposes. The overall size or time-length of the MAP message may be determined by network requirements. However, it is preferable that each MAP be of a predetermined, fixed size.

Additionally, it will be appreciated that, in alternative embodiments of the present invention, the number of minislots in a MAP message which are reserved for CBR purposes may greater than or less than 60. For example, in one particular embodiment, a channel may be setup where the CBR portion of the MAP message utilizes 32 minislots. Alternatively, the CBR portion of the MAP may utilize 128 minislots. In these embodiments, the ALLOC_STATE, ALLOC_VACANCY, GRANT_MASK size/bit operations should be configured accordingly (as described below).

In order to implement unsolicited grant service (UGS), generally referred to as constant bit-rate (CBR) service, within the cable modem network, it is desirable to provide a simple and effective technique for scheduling unsolicited grants of minislot allocations to requesting cable modems at constant, periodic intervals. In accordance with a specific embodiment of the present invention, each upstream channel instance includes a set of IOS lists for unsolicited grants (CBR service) and/or request polls, and a set of FIFO/priority queues for queuing non-CBR type time slot requests from cable modems. The linked lists are populated by the admission control block 231a (FIG. 2C), wherein the position and list index of a CBR grant is chosen based on the service class parameters of the newly admitted real time flow (CBR service). Thereafter, the entries in the list remain static and are periodically served by the MAP building block 231b (FIG. 2C). An entry gets dequeued from the list(s) when the corresponding real-time flow state is to be deleted from the CMTS.

The FIFO/priority grant queues of each upstream channel are dynamically populated and served when a cable modem sends a time slot request to the CMTS, or when the CMTS ranging poll server detects that it is time to solicit a ranging request from a particular cable modem on the upstream channel.

The time slot request processing block 231c (FIG. 2C) is also involved when the CMTS receives a time slot request interrupt from a driver. One purpose of the time slot request processing block is to process the time slot request MAC message, and then enqueue the request into the appropriate service class FIFO/priority queue, by consulting the service class information associated with the service ID (SID) of the requesting cable modem. Before enqueuing a time slot request for subsequent data grants, time slot request processing block 231c performs checks on the validity of the requesting cable modem's SID, request size, and rate limit status of the flow.

Thus, in accordance with a specific embodiment of the present invention, unsolicited grant service may be implemented in a cable modem network or other shared access media networks by providing at least one data structure which includes one or more grant allocation elements relating to CBR service requests by cable modems (or nodes) on a particular upstream channel. This data structure may be implemented as one or more linked lists of grant allocation elements, as shown, for example, in FIG. 5 of the drawings.

Figure 5:
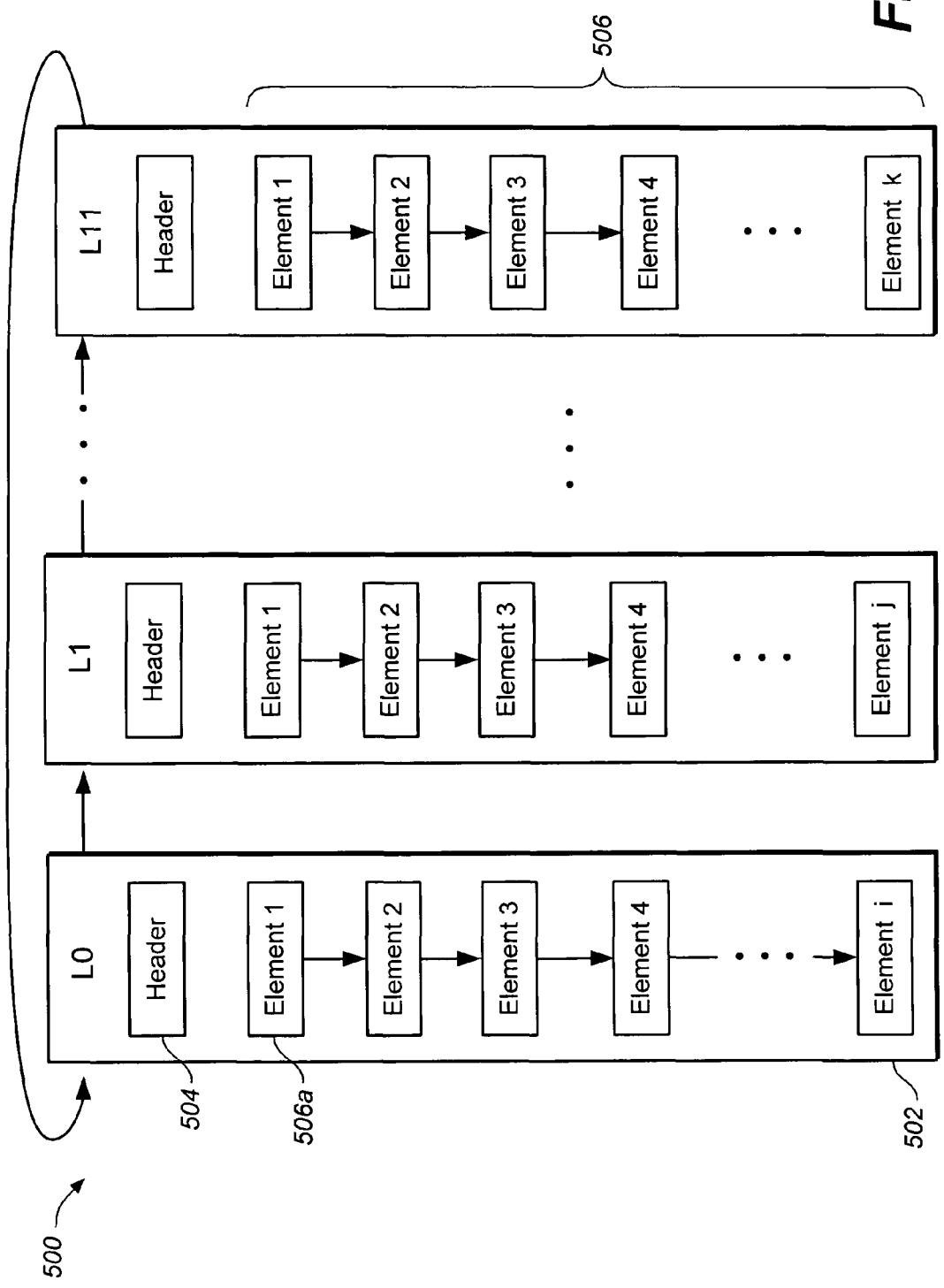
FIG. 5 shows a schematic block diagram of a plurality of linked lists of unsolicited grant allocation elements in accordance with a specific embodiment of the present invention.

FIG. 5 shows a schematic block diagram of a plurality of linked lists of unsolicited grant allocation elements in accordance with a specific embodiment of the present invention. Each linked list 502 within list array 500 includes a header portion 504 and one or more grant allocation elements 506 relating to CBR or UGS service requests by cable modems on a particular upstream channel. Each list 502 corresponds to one MAP message which may be periodically generated. More specifically, each element 506a within list L0 describes all UGS allocations for minislots within portion 402 of MAP 400 (FIG. 4). As will be described in further detail below, this portion 402 of MAP message 400 may be periodically generated for providing UGS service to cable modems identified by the plurality of elements 506 of list L0 (FIG. 5). The remainder portion of minislot allocations 404 of MAP message 400 is generated in a manner currently implemented by conventional CMTS systems.

As shown in FIG. 5, a plurality of linked lists 500 (e.g. L0, L2 . . . , L11) may be used by the CMTS to generate a respective plurality of MAP messages, each MAP corresponding to a particular linked list. Thus, for example, twelve linked lists may be used to generate respective portions of twelve distinct channel MAP messages. Moreover, for UGS service, the twelve distinct portions of channel MAP messages may be re-generated at constant, periodic intervals to thereby provide UGS service to desired cable modems. This technique is described in greater detail below.

As shown in FIG. 5, each linked list 502 includes a header portion 504 and a linked list of grant allocation elements 506a. These features are described in further detail with reference to FIGS. 6A and 6B of the drawings.

Figure 6B:
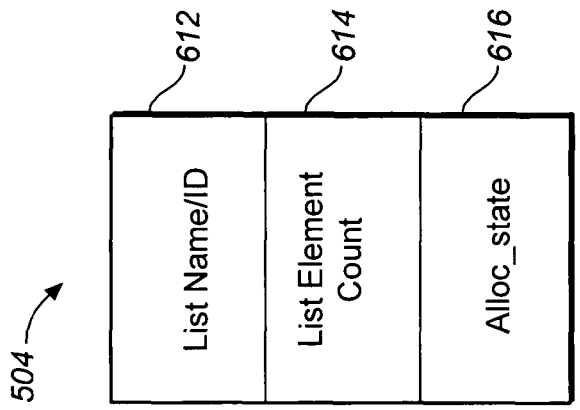
FIG. 6B shows a schematic block diagram of various fields included within header block 504 of FIG. 5.
Figure 6A:
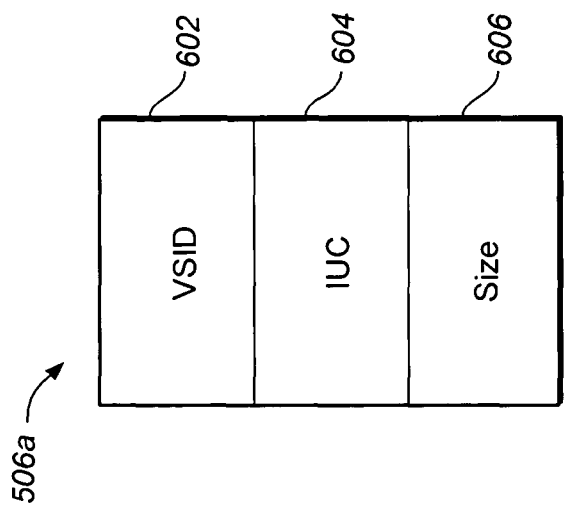
FIG. 6A shows a schematic block diagram of various fields included within each grant allocation element 506a of FIG. 5.

FIG. 6A shows a schematic block diagram of various fields which are included within each grant allocation element 506a of FIG. 5. Each element 506 within each linked list represents a grant allocation for UGS (or CBR) service for a particular cable modem. Thus, as shown in FIG. 6A, each grant element 506a includes a voice service ID (VSID) field 602 for identifying a particular modem associated with each allocated CBR grant; an interval usage code (IUC) field for indicating a particular burst profile or modulation profile type to be used for the associated grant allocation; and a grant size field 606 for indicating a grant size of each respective allocated grant. In a specific embodiment, the grant size will be expressed in terms of the number of minislots needed for servicing the UGS request every t milliseconds.

It will also be appreciated by one having ordinary skill in the art that the specific information within each grant element 506a may differ according to the specific protocol utilized by the network. For example, other networks may use a different type of identifier (other than a SID or VSID) to identify a particular node in the network requesting CBR service. Additionally, some networks may not support different burst profile modulation types. In such networks, the IUC descriptor field 604 (FIG. 6A) may be omitted.

FIG. 6B show a schematic block diagram of various fields which are included within header block 504 of FIG. 5. The header field 504 includes a list name/ID field 612 identifying that particular linked list, and a list element count field 614 which specifies the total number of grant allocation elements 506 included within that particular list. One advantage of this field is that it provides a means for verifying the integrity of the linked list since the value within this field may be compared against the number of actual grant elements within the list. Additionally, header 504 also includes an ALLOC_STATE field 616. The ALLOC_STATE field 616 provides a representation of the reservation status of each minislot contained within the CBR region 402 of the respective MAP message generated using this particular linked list.

Figure 6C:
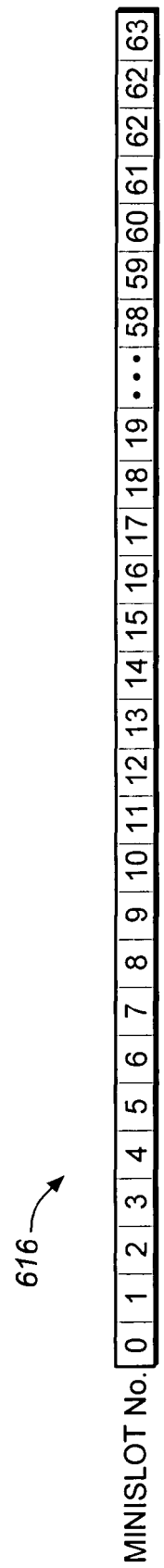
FIG. 6C shows a specific embodiment of an ALLOC_STATE field 616 of FIG. 6B.

In a specific embodiment of the present invention, the ALLOC_STATE field 616 is implemented as a 64-bit unsigned, binary integer as shown, for example, in FIG. 6C of the drawings. It is to be noted that the actual size of the ALLOC_STATE field may vary, depending upon the size of the channel MAP message of the cable modem network. However, at a minimum, the size of the ALLOC_STATE field should preferably include a number of bits at least equal to the number of minislots within the CBR region 402 of the MAP message. The specific embodiment of ALLOC_STATE field 616 of FIG. 6C includes 64-bits, 60 of which are used for used representing CBR minislot allocations in a respective MAP message.

Each bit in this ALLOC_STATE integer represents the status of a respective, corresponding minislot allocated by the plurality of elements 506 in that particular linked list 502. The reservation status of each respective minislot is indicated by either a one or a zero. For example, a bit having the value 1 indicates that the corresponding minislot is used for some CBR grant in the associated linked list. A bit having the value 0 indicates that the corresponding minislot is vacant and can be used for any new grant element added to the linked list.

As an illustrative example, a portion of an ALLOC_STATE field is represented below:

000111100011000 . . .

In this example, a portion of the ALLOC_STATE field is shown which describes the reservation status or state of each CBR minislot within a MAP message associated with a particular linked list. The first three minislots are vacant, as represented by the first three zeros in the ALLOC_STATE field. Thus, these minislots may be used by admission control to add a new grant allocation, or, alternatively, it may be used for a non-voice grant such as, for example, a fragmented data grant. After the first three zeros, at an offset of three minislots, four consecutive 1's are shown. These 1's represent one or more CBR grants which span over the next four consecutive minislots. Because these minislots have already been allocated for UGS service, they are reserved, and cannot be used for other purposes at this time. At minislot offset 7, two zeros are shown, indicating that these two minislots in the associated MAP message are vacant.

Thus, the ALLOC_STATE field of each linked list serves as a bit image map of the CBR minislot allocations for the CBR MAP portion which is generated using the linked list associated with that particular ALLOC_STATE field. As explained in greater detail below, this ALLOC_STATE map is consulted during admission control as a means for quickly and easily determining availability of minislots for CBR grant allocations in the list being investigated.

In order to accommodate unsolicited grant service in a cable modem network, a new upstream flow scheduling technique is introduced for real-time CBR flows like Voice/Fax/Video. This new flow scheduling technique may be conveniently referred to as unsolicited grant service (UGS). Parameters associated with the unsolicited grant service include: (1) Maximum packet size, (2) Maximum unicast data grant interval, (3) Minimum unicast data grant interval. The maximum packet size may be expressed, for example, in terms of bytes. The unicast data grant interval may be expressed, for example, in terms of milliseconds. Thus, when a cable modem issues a UGS request, it sends a request to the CMTS for periodically transmitting a packet of p-bytes every t-milliseconds. The CMTS then tries to reserve a transmit opportunity (UGS grant) for a maximum size packet of p-bytes every t-milliseconds, which presumably is the minimum unicast data grant interval. In a specific embodiments where both the maximum and minimum unicast data grant intervals are provided, the CMTS will try to schedule a transmit opportunity for a particular grant interval which may vary from the minimum unicast data grant interval to the maximum unicast data grant interval.

At MAP building time, MAP construction block 231b (FIG. 2C) serves each linked list of CBR grant allocation elements one at a time. The current list to be served in each MAP is indicated by a current index or index pointer.

Whether jitter is tolerated or not, and if fragmentation is supported or not dictates whether the unsolicited grants are put in the MAP message by the upstream MAC scheduler. In networks where zero jitter is desired, requesting cable modems are allocated grants at fixed positions in the MAPs by inserting appropriate grant allocation elements into the appropriate linked lists of list array 500. Once the CBR grant has been allocated and the position fixed, it is not moved from the static grant list until the end of the connection (e.g., until the cable modem completes its voice call or other CBR related application).

After a cable modem has finished its call, there will be gaps in the unsolicited grant region of the MAP. If permitted, these gaps may be used as data grants for committed information rate (OR) traffic or best effort (BE) traffic, or, alternatively, may be used as contention/station maintenance slots. Alternatively, admission control may utilize one or more of these gap regions for servicing a new CBR service request.

Figure 7:
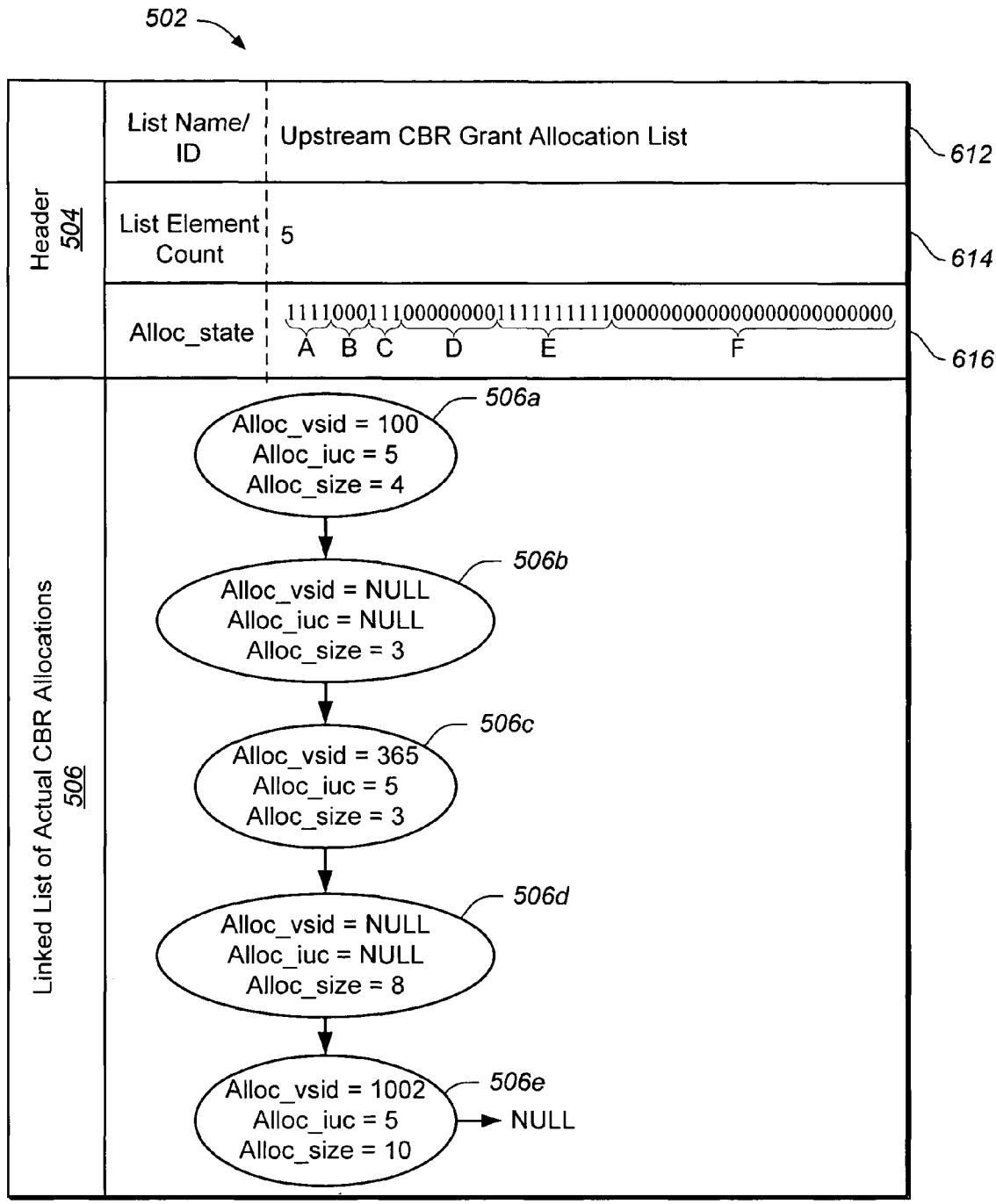
FIG. 7 shows a schematic block diagram of an example of linked list 502 of FIG. 5.

FIG. 7 shows a schematic block diagram of an example of a linked list 502 of FIG. 5. The linked list 502 of FIG. 7 includes a header portion 504 and a linked list portion 506 of actual CBR grant allocation elements. The linked list is identified by its list name/ID field 612 in header portion 504. A list element count 614 in the header provides a value which should preferably correspond with the number of grant elements within portion 506. The ALLOC_STATE field 616 in the header provides a bit image map of the allocation status of each CBR minislot for the MAP message which is to be generated using list 502 of FIG. 7. The particular value of each bit within ALLOC_STATE field 616 should preferably correspond to a respective CBR grant allocation element of linked list portion 506.

For example, grant allocation element 506a identifies a CBR grant allocation of four minislots (ALLOC_SIZE=4). These four allocated minislots correspond to the four consecutive 1's identified by reference letter A in ALLOC_STATE field 616. The other parameters within grant allocation element 506a specify the associated CBR service ID of the requesting cable modem (ALLOC_VSID=100), and the burst profile type to be used by the modem when sending the CBR data during the corresponding grant. In this particular example, an IUC value of five indicates a burst profile for a short grant. Alternatively, although not shown, a burst profile for a long grant (e.g. IUC=6) may be used where appropriate.

These burst profile types are commonly known to one having ordinary skill in the art, and therefore will not be described in greater detail in this application.

The next grant element 506b includes parameters which specifies a NULL VSID value and a NULL IUC value. The NULL VSID value indicates that the respective minislots associated with this grant element are vacant or available. The size of this grant is three (3) minislots (ALLOC_SIZE=3), which corresponds to the three consecutive 0's identified by reference letter B in ALLOC_STATE field 616. One purpose for providing a NULL VSID grant allocation element such as that of 506b is that such grant elements may be inserted as padding around newly admitted CBR grant elements in order to maintain zero jitter for neighboring CBR grant elements within a particular linked lists. This feature is described in greater detail in a latter section of this application.

The next grant element 506c indicates a CBR grant allocation of three (3) minislots to the cable modem associated with VSID=365. This grant allocation is represented by the three consecutive 1's identified by reference letter C in ALLOC_STATE field 616.

The next grant element 506d indicates a vacancy (NULL VSID) of eight minislots, which is represented by the eight consecutive 0's identified by reference letter D in ALLOC_STATE field 616.

The next grant element 506e indicates a CBR grant size of ten minislots allocated to the cable modem associated with VSID=1002. This grant is represented by the ten consecutive 1's identified by reference character E in ALLOC_STATE field 616. A NULL expression at the end of the linked list of grant allocation elements indicates that the remainder of CBR minislots in the associated channel MAP are vacant, which is represented by the string of consecutive zeros identified by reference letter F in ALLOC_STATE field 616.

It is to be noted that the examples in this application consistently use a bit value of 1 to represent minislots which have been reserved or allocated for servicing CBR service requests, and a bit value of 0 to represent vacant minislots. However, the respective interpretation of each bit value may be interchanged where desired without departing from the scope of the present invention. That is to say, a bit value of 0 could be used to represent a reserved minislot status, and a bit value of 1 to represent a vacant minislot status. In this latter embodiment, appropriate hardware and/or software would need to be modified to conform to the new interpretation of these bit values. Such modifications are easily implemented by one having ordinary skill in the relevant art.

Figure 9:
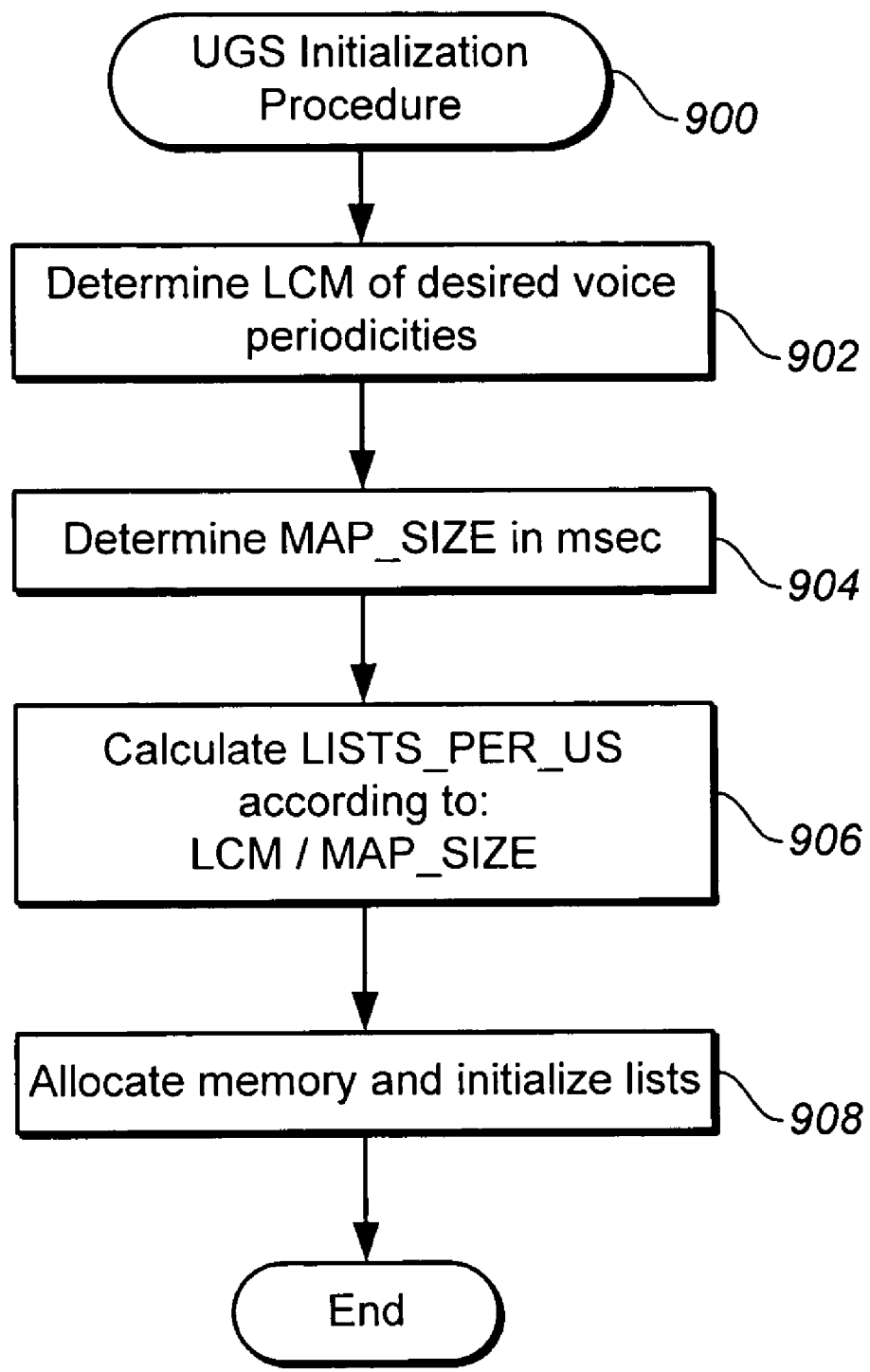
FIG. 9 shows a flow diagram of an unsolicited grant service initialization procedure in accordance with a specific embodiment of the present invention.

FIG. 9 shows a flow diagram of an unsolicited grant service initialization procedure 900 of the technique of the present invention.

Each upstream channel instance has an array of CBR grant allocation lists. The number of lists per upstream channel (LISTS_PER_US) may be computed at initialization time, or may be a predetermined fixed constant. The computation of the LISTS_PER_US value is computed according to the formula: LCM/MAP_SIZE, where LCM indicates the least common multiple of CBR grant periodicities supported by the CMTS, and the MAP_SIZE indicates the size of the channel MAP in milliseconds.

Returning to FIG. 9, at 902, the least common multiple of all desired voice peridocities is determined. Typical voice over IP codecs (such as, for example, G.711/G.729) generate voice packets every 5, 10, 20, 30 milliseconds. Thus, in order to support each of these different periodicities, it is desirable to calculate the least common multiple of these periodicities, which, in this case is equal to 60 milliseconds. The calculated LCM value may differ for each network, depending upon the particular CBR periodicities supported.

One advantage of the present invention is that it provides a technique for supporting voice traffic with different encoding techniques and packetization delays. Since different vendor cable modems may choose to employ different types of voice/fax codecs, each voice/fax codec may have its own packet size, and packet inter-arrival period. By supporting different grant sizes and periods, the technique of the present invention increases the flexibility of the CMTS since it can now service voice/fax calls from multi-vendor modems on same upstream channel.

At 904, the MAP size (MAP_SIZE) of the channel MAP is determined in milliseconds. In a specific embodiment of the present invention, as shown in FIG. 4, for example, the MAP size is a fixed length of 5 milliseconds.

At 906 the value LISTS_PER_US is calculated according to LCM/MAP_SIZE. Thus, LISTS_PER_US=60/5=12 lists. Accordingly, at 908, memory is allocated for each of the twelve lists per upstream channel, and the lists are initialized.

Figure 10:
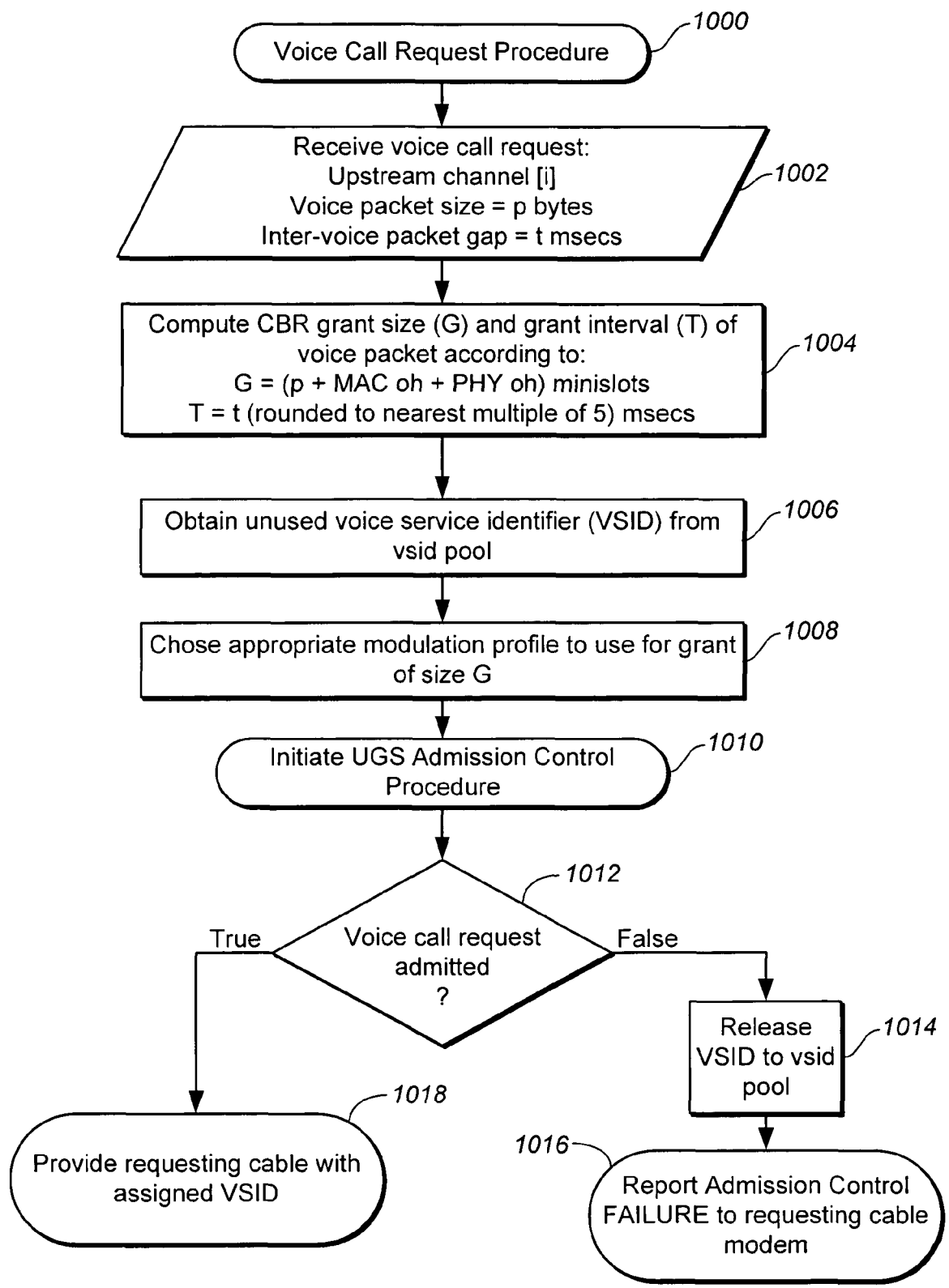
FIG. 10 shows a flow diagram of a Voice Call Request procedure in accordance with a specific embodiment of the present invention.

FIG. 10 shows a flow diagram of a VOICE_CALL_REQUEST procedure 1000 in accordance with a specific embodiment of the present invention.

Procedure 1000 is initiated when a cable modem transmits a voice call request or other CBR-type service request to the CMTS. At 1002, the voice call request is received at the CMTS and the input parameters of the request are identified. More specifically, a first input parameter of the voice call request is the particular upstream channel [i] associated with the cable modem sending the request. A second input parameter is the voice packet size p of the request, which is described in terms of bytes or other suitable units. A third input parameter is the inter-voice packet gap t, which is described in terms of milliseconds or other suitable time measurement. The voice call request may therefore be summarized as a request for transmitting a packet of p-bytes every t-milliseconds on upstream channel [i] of the network.

At 1004, the CBR grant size G and grant interval T of the voice call request is calculated. The CBR grant size G of the request is determined according to the formula G=(p+MAC OH+PHY OH), expressed as minislot units. The value for G is expressed in upstream channel[i] minislot units. The MAC OH value represents the MAC overhead required for framing the packet within a MAC frame header and a MCNS header. The PHY OH value represents the physical layer overhead which includes, for example, a preamble, a guard band, and FEC bytes. The value for the PHY OH component may differ depending upon the particular upstream channel selected. Accordingly the calculated grant size will depend upon the particular upstream channel[i] utilized.

The grant interval T is calculated according to T=t, expressed in milliseconds. The value of T is then rounded to the nearest multiple of five milliseconds. This rounding of five milliseconds corresponds to the lowest value of voice periodicities (determined in procedure 900 of FIG. 9) which is to be supported by the CMTS. Thus, the grant interval time value T should preferably be rounded to the nearest multiple of n, where n specifies the lowest CBR periodicity supported by the network elements.

At 1006, an unused CBR service identifier (VSID) is obtained from the VSID pool. Each modem in the network has a unique primary SID used for transmitting and receiving data to and from the CMTS. However, for voice service or other CBR type services, a new SID (or VSID) is assigned to the voice call request and is used for associating the voice call request with the primary SID of the particular cable modem making the request. The voice SID is obtained from a VSID pool, which enables each VSID value to be reused after its associated voice service call has ended.

At 1008, the appropriate modulation profile (IUC value) for the CBR service request is selected based upon the CBR grant size G. Appropriate modulation profiles include a short burst profile, and a long burst profile.

At 1010, an Admission Control procedure (FIG. 11) is initiated to determine whether the MAC scheduler is able to allocate periodic grants of size G minislots every T milliseconds on upstream channel [i] to the requesting cable modem. The UGS Admission Control procedure which is initiated at 1010 of FIG. 10 is described in further detail in FIG. 11A of the drawings. This procedure is discussed in greater detail below. However, at this point, it is sufficient to note that procedure 1100 of FIG. 11A will return either a true value for admitting the voice call request, or a false value for denying the voice call request.

At 1012 (FIG. 10), the results of the UGS Admission Control procedure are analyzed. If admission control determines that the voice call request can be admitted, at 1018, the CMTS reports successful admittance of the voice call request to the cable modem by providing the requesting cable modem with its newly assigned VSID value. In subsequent channel MAP messages, the cable modem will be able to transmit its voice information using CBR grant minislots specifically allocated for this particular VSID value.

If, however, admission control determines that the voice call request cannot be admitted, at 1014, the temporary VSID is released back to the VSID pool, and at 1016 the cable modem is notified that its voice call request has been denied.

Figure 11A:
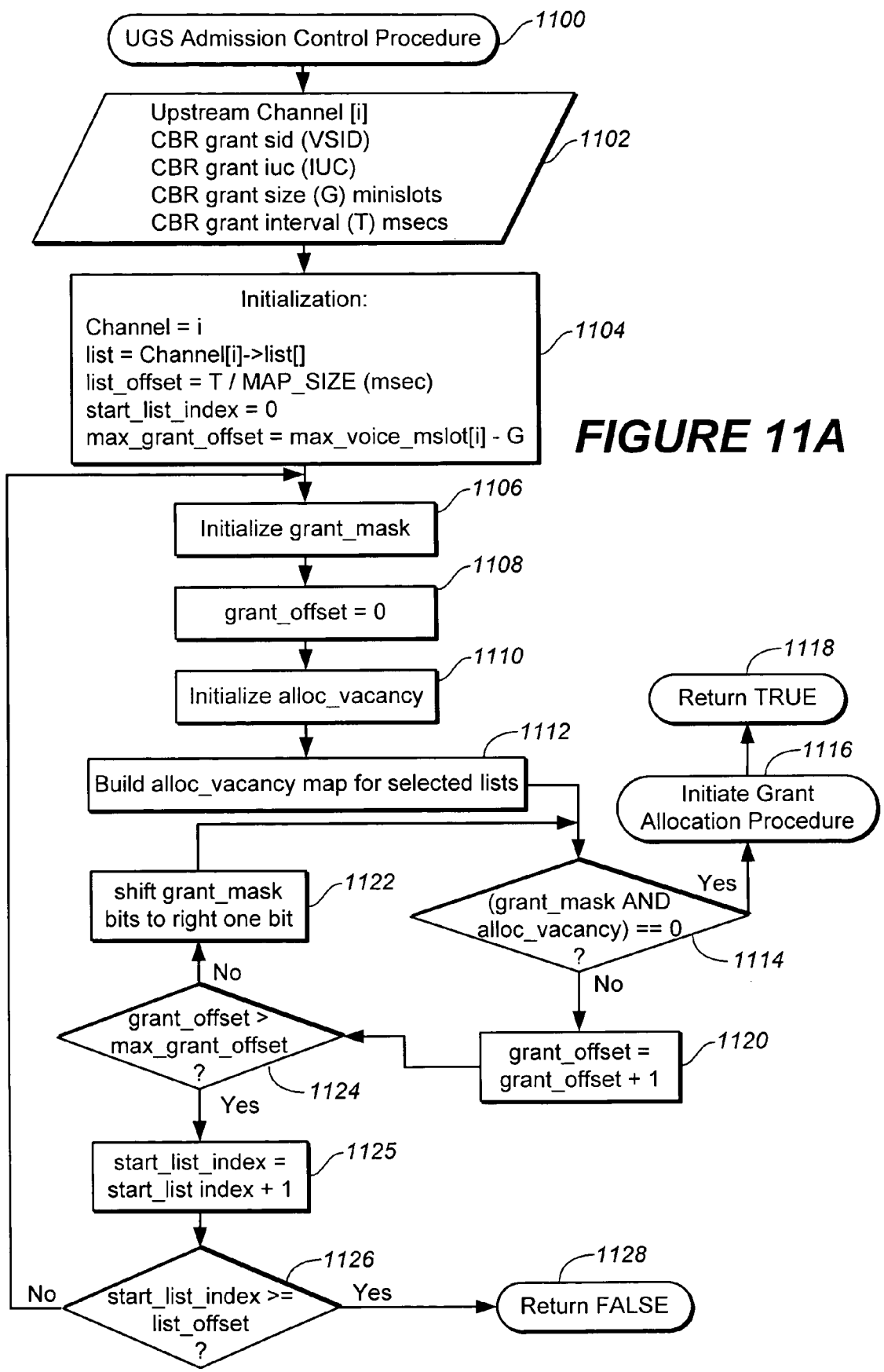
FIG. 11A shows a flow diagram of an unsolicited grant Admission Control procedure in accordance with a specific embodiment of the present invention.

FIG. 11A shows a flow diagram of a specific embodiment of an unsolicited grant Admission Control procedure 1100 such as that called, for example, at block 1010 of FIG. 10. A detailed description of this procedure will now be provided with reference to FIGS. 8, 11B, and 11C of the drawings.

Referring to FIG. 11A, the UGS Admission Control procedure 1100 is implemented within MAC layer 230 (FIG. 2A). At 1102, a plurality of input parameters are passed to the MAC scheduler, whereupon the MAC scheduler determines whether or not to admit the unsolicited grant service request according to the procedure shown in FIG. 11A. A first input parameter specifies the particular upstream channel[i] which is to be used for analysis. A second input parameter specifies the service identifier (VSID) associated with the modem making the CBR service request. A third input parameter specifies the particular modulation profile (IUC) to be used in servicing the CBR request. A fourth input parameter specifies the grant size (G) associated with the CBR request, expressed in minislot units. A fifth input parameter specifies the grant interval (T) associated with the CBR request, expressed in milliseconds.

At 1104, initialization of various parameters is performed. More specifically, these initialization parameters include selecting the specified channel[i] for UGS admission control analysis; setting a list pointer (LIST[ ]) to point to the head of a particular linked list array 500 associated with channel[i]; and setting a LIST_OFFSET value equal to the expression LIST_OFFSET=T/MAP_SIZE, where MAP_SIZE is measured in milliseconds. The LIST_OFFSET variable is used to determine the particular lists to be selected from list array 500 (FIG. 5) for servicing the CBR service request currently being analyzed for admission control.

For example, let us suppose that there are 12 linked lists within linked list array 500. Further, let us suppose that a particular modem makes a CBR request to receive unsolicited grants every 10 milliseconds. The grant interval T for this CBR request will be T=10 (milliseconds). As stated previously, in a specific embodiment of the present invention, one MAP message measures 5 milliseconds in length. Thus, the value for MAP_SIZE=5 milliseconds. Since the requested CBR grant only requires servicing every 10 milliseconds, a CBR grant allocation for this request need only be included in every other MAP message. Further, since each linked list 502 in list array 500 corresponds to one periodically generated MAP message, scheduling for the requested CBR grant could be accomplished by inserting a corresponding CBR grant element in every other linked list within list array 500, which corresponds to the LIST_OFFSET value. In other words, using the expression LIST_OFFSET=T/MAP_SIZE, we arrive at LIST_OFFSET=10/5=2. The use of the LIST_OFFSET value will become more apparent in the description of FIG. 11D, which is presented in a latter section of this application.

Also, as shown in 1104, a START_LIST_INDEX variable is initialized to have an initial value of zero. The use of the START_LIST_INDEX value is described in greater detail below. Additionally, as shown in 1104, a MAX_GRANT_OFFSET variable is initialized to equal the expression: MAX_VOICE_MSLOT [i]−G, wherein the MAX_VOICE_MSLOT variable represents the maximum number of minislots available for voice service in a channel MAP message for a particular channel[i], and G represents the size in minislots of a requested CBR grant. In a specific embodiment of the present invention, the MAX_VOICE_MSLOT value is equal to 60 minislots.

After the various initialization procedures have been completed, a GRANT_MASK field is initialized (1106). The GRANT_MASK field provides a bit representation of the requested CBR grant. An example of an initialized GRANT_MASK field is shown in FIG. 11B of the drawings.

Figure 11B:
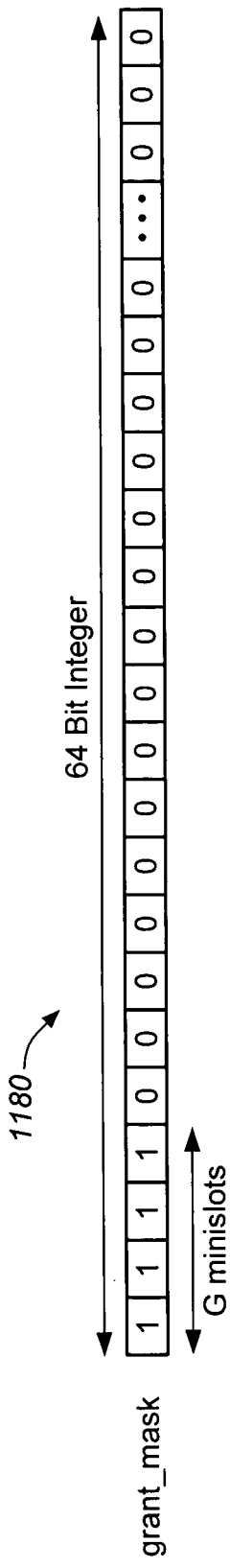
FIG. 11B shows an example of a specific embodiment of a GRANT_MASK field in accordance with the technique of the present invention.

In the specific embodiment shown In FIG. 11B, the GRANT_MASK 1180 is implemented as an unsigned 64-bit integer. The number of bits represented in the GRANT_MASK field should preferably correspond to the number of bits represented in the ALLOC_STATE field 616 (discussed previously).

In the example of FIG. 11B, the size of the CBR grant request (G) is four minislots. Thus, the GRANT_MASK for this CBR request is initialized to include four consecutive 1's in the most significant bit portions of the 64-bit integer, which represents an allocation of four minislots. The remainder of the GRANT_MASK field is initialized with all zeros. In an alternative embodiment, a grant mask representing a CBR grant request of 2 minislots is shown, for example, in FIG. 8 of the drawings (810, FIG. 8).

As will be described in greater detail below, the GRANT_MASK bit representation is used by the Admission Control procedure to determine the availability of vacant slots within one or more ALLOC_STATE fields 616 for inserting the requested CBR grant.

At 1108, a GRANT_OFFSET variable is initialized to have an initial value of zero. The use of the GRANT_OFFSET variable is described in greater detail below.

Figure 11C:
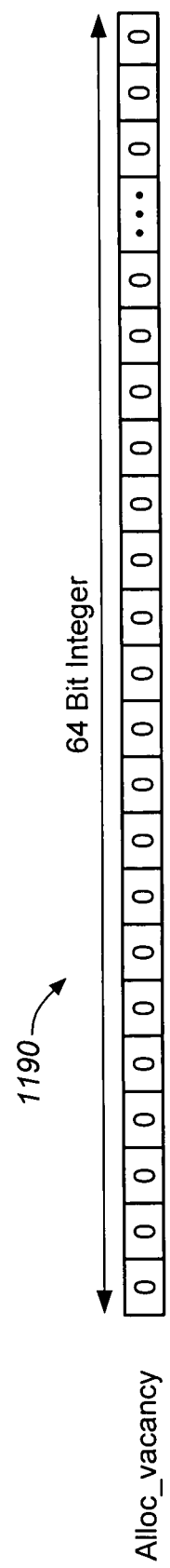
FIG. 11C shows an initialized ALLOC_VACANCY field in accordance with a specific embodiment of the present invention.

At 1110, an ALLOC_VACANCY field is initialized. An example of an ALLOC_VACANCY field which has been initialized is shown in FIG. 11C of the drawings. The specific embodiment of the ALLOC_VACANCY field 1190 shown in FIG. 11C has been implemented as a 64-bit integer, which corresponds to the bit size of the ALLOC_STATE field 616. At a minimum, the bit size of the ALLOC_STATE field 616, ALLOC_VACANCY field 1190, and GRANT_MASK field 1180 should preferably be at least as large as the number of minislots reserved for CBR (or UGS) purposes in each channel[i] MAP message. As described in greater detail below, the ALLOC_VACANCY field 1190 provides a bit representation of a compiled allocation status of ALLOC_STATE fields from selected linked lists. In a specific embodiment, ALLOC_ STATE fields from selected linked lists of lists array 500 (FIG. 5) are logically ORed with ALLOC_VACANCY field 1190 to produce a compiled representation of the allocation status of CBR minislots corresponding to those selected linked lists.

Figure 11D:
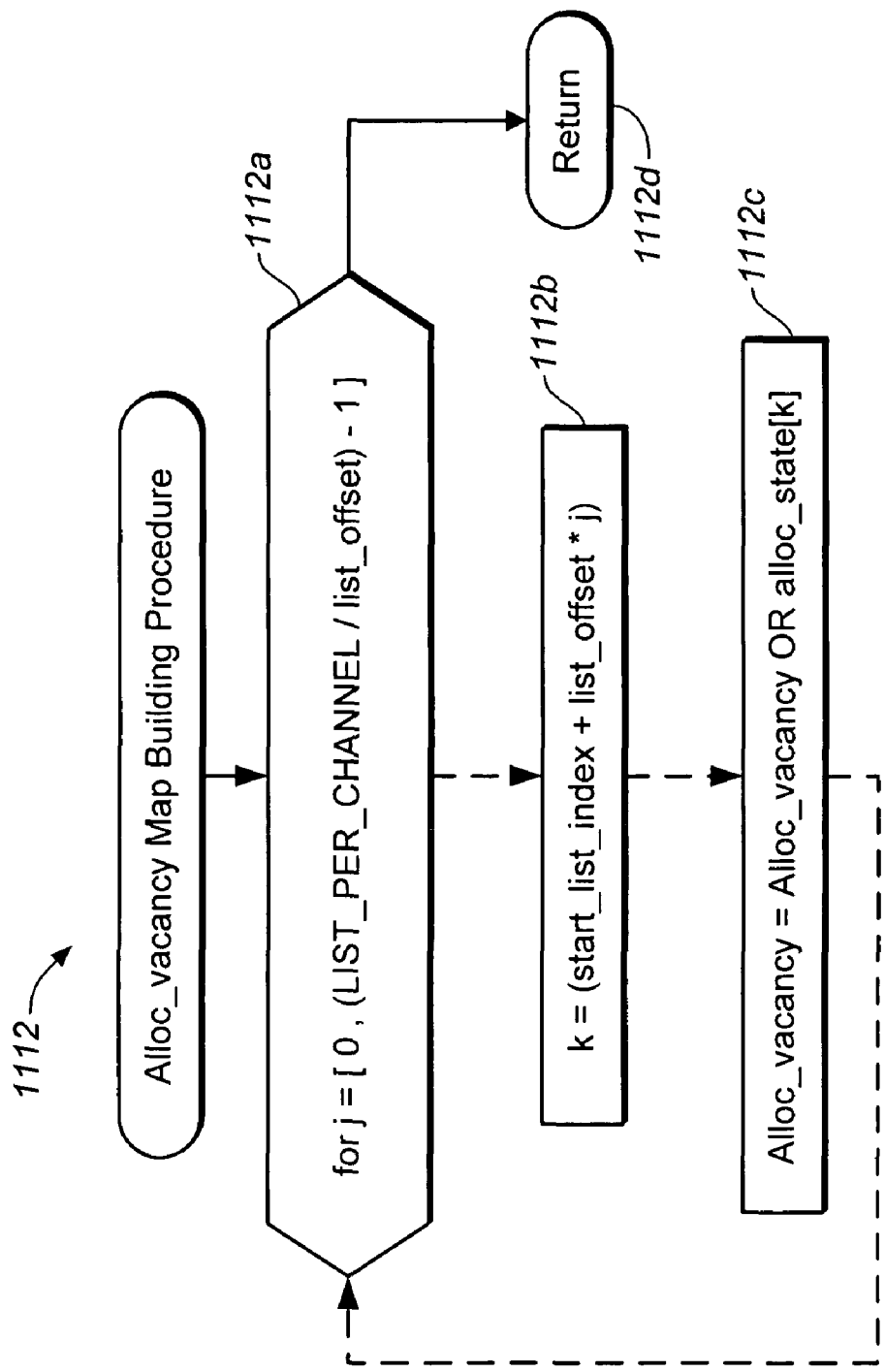
FIG. 11D shows a flow diagram of an ALLOC_VACANCY Map Building procedure in accordance with a specific embodiment of the present invention.

At 1112, an ALLOC_VACANCY MAP is constructed for selected linked lists of lists array 500 (FIG. 5). A flow diagram of the ALLOC_VACANCY building procedure is shown in FIG. 11D of the drawings. As shown at 1112a (FIG. 11D) a for-each loop is used for construction the ALLOC_VACANCY MAP of the selected linked lists. The value of the upper limit of the loop is determined according to the expression: (LIST_PER_CHANNEL/LIST_OFFSET)−1. The LIST_PER_CHANNEL value represents the total number of linked lists within list array 500 (FIG. 5). The LIST_OFFSET value is described above with respect to block 1104 (FIG. 11A). Thus, for example, where the LIST_OFFSET value is equal to 2 (which specifies the use of every other list within list array 500), and the number of lists per channel is equal to 12, the four-each loop at 1112a will start at zero and continue until the value 12/2−1=5 is reached. The variable j represents the current cycle number of the for-each loop.

At 1112b, the variable k is set equal to the expression: START_LIST_INDEX+LIST_OFFSET*j. The START_LIST_INDEX variable represents the particular starting list 502 within list array 500 (FIG. 5). In a specific embodiment, the START_LIST_INDEX value has been initialized to zero, meaning that the ALLOC_VACANCY MAP will be constructed from linked list array 500 beginning at the first list (L0) of the list array. In the example above, as the variable j runs through its values [0, 1, 2, 3, 4, 5], the variable k will be assigned values [0, 2, 4, 6, 8, 10], respectively.

Actual construction of the ALLOC_VACANCY MAP occurs at 1112c, whereby the 64-bit integer representing the ALLOC_VACANCY field (1190, FIG. 11C) is logically ORed to the 64-bit integer representing the ALLOC_STATE field 616 of a selected linked list 502 of list array 500. The particular selection of the linked list and corresponding ALLOC_STATE field is determined by using the variable k (described above) as an index for selecting a particular ALLOC_STATE [k].

Figure 8:
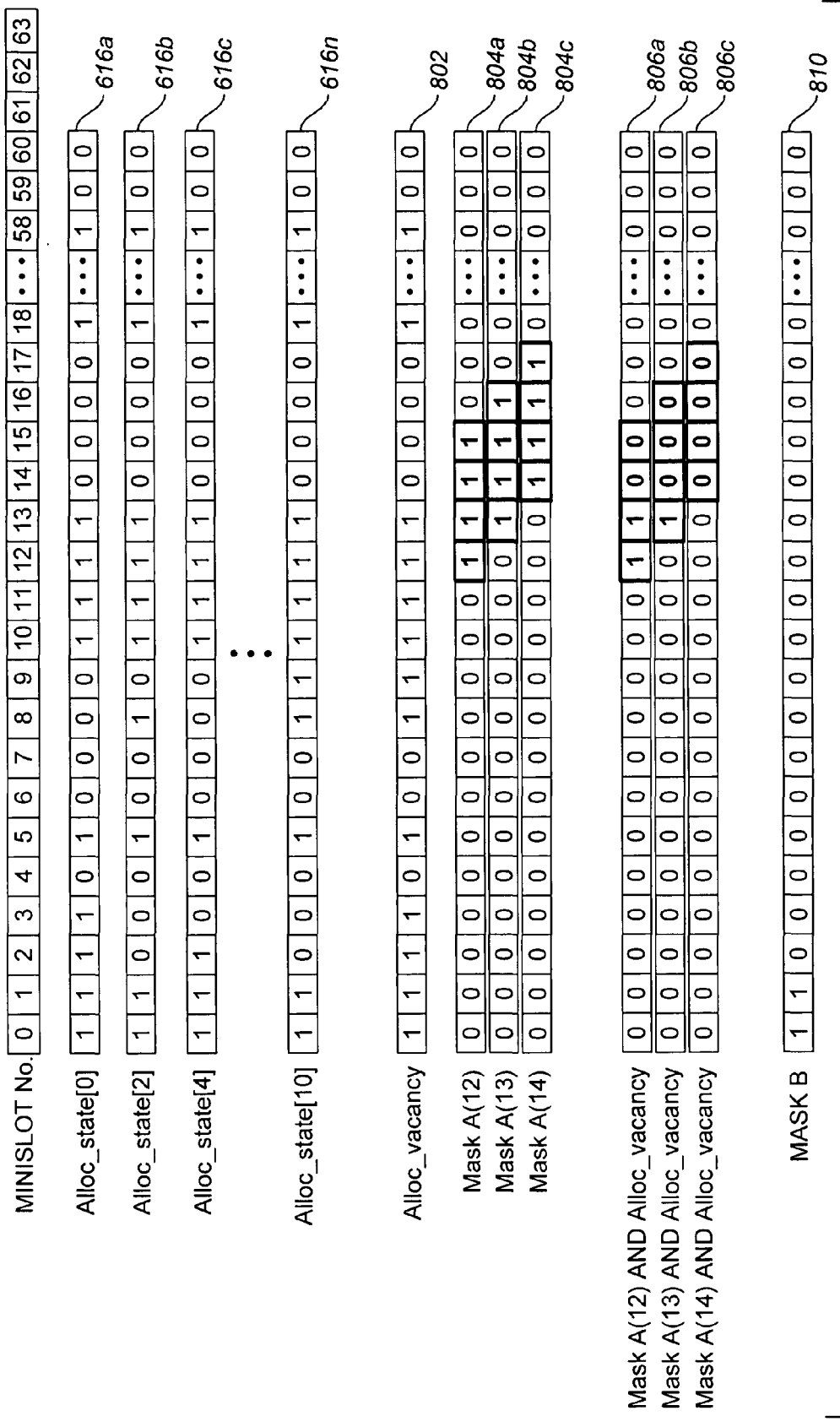
FIG. 8 shows an example of how the ALLOC_STATE, GRANT_MASK, and ALLOC_VACANCY fields described herein are used for determining admission control for a voice call request in a cable modem network.

An example of an ALLOC_VACANCY Map Building procedure is shown in FIG. 8 of the drawings. In the example of FIG. 8, it is assumed that the START_LIST_INDEX value is equal to zero, and the LIST_OFFSET value is equal to two, meaning that a grant allocation element is to be inserted in every other linked list of list array 500, beginning with list L0. Accordingly, the ALLOC_VACANCY field 802 will be constructed by logically ORing together the initialized ALLOC_VACANCY integer 1190 (FIG. 11C) and the integers representing ALLOC_STATE [0, 2, 4, 6, 8, 10] using the technique described the flow diagram of FIG. 11D. The resulting ALLOC_VACANCY MAP 802 represents a compiled status of reserved and vacant CBR minislots associated with the selected linked lists.

After the ALLOC_VACANCY MAP 802 has been constructed, it may then be used to determine whether there is space available for admission of a CBR service request having a grant size of G minislots. This is easily done by searching the ALLOC_VACANCY MAP 802 for bits indicating an unreserved minislot (e.g., bits having a value of zero). Any bit within the ALLOC_VACANCY integer 802 having a value of zero represents a corresponding vacant minislot in each of the selected linked lists (L0, L2, L4, L6, L8, L10).

After the ALLOC_VACANCY MAP has been constructed, the GRANT_MASK (a bit representation of the grant size G of the CBR service request being evaluated for admission control) is used to determine the availability of G consecutive CBR minislots which can be allocated at the same relative position in each of the respective, selected linked lists. This technique is described in the flow diagram of FIG. 11A.

In order to support zero jitter in servicing a CBR grant request, it is important that all grant allocation elements inserted into any of the selected links lists for servicing the CBR request be inserted in exactly the same relative position within each of the selected linked lists. For example, if minislots 2, 3, 4, 5 of a first linked list are able to be allocated for servicing a particular CBR grant request, these same minislots must also be available in any other linked lists which are required for supporting the CBR grant request. Fortunately, the ALLOC_VACANCY MAP 802 which is constructed using the technique of the present invention inherently shows only those vacant minislots having the same relative position in each of the selected linked lists.

Returning to FIG. 11A, at 1114, a logical AND operation is performed between the GRANT_MASK and the ALLOC_VACANCY MAP. If the results of this AND operation are zero, this indicates that the availability of G minislots in each of the selected linked lists, wherein each of the available minislots occupies the same relative location in each of the selected linked lists. Accordingly, the CBR service request under analysis may be admitted, and at 1116 the Grant Allocation procedure for allocating grants corresponding to this CBR service request is initiated. At 1118, a value of "TRUE" is returned to the Voice Call Request procedure 1000 (FIG. 10).

If, however, the result of the logical AND operation between the GRANT_MASK field and the ALLOC_VACANCY field is not equal to zero, the current starting minislot of the CBR grant (specified by the bits in the GRANT_MASK) cannot be allocated at the same relative position in each of the selected linked lists. Accordingly, the bits in the grant mask are shifted to the right by one bit and again logically ANDed to the ALLOC_VACANCY MAP, as described in greater detail below.

Before the bits and the grant mask are shifted, at 1120, the value of the GRANT_OFFSET variable is incremented by one. This register or variable keeps track of the number of shifts performed upon the GRANT_MASK integer.

At 1124, the value of the GRANT_OFFSET variable is compared against the MAX_GRANT_OFFSET value. In a specific embodiment of the present invention, the MAX_GRANT_OFFSET value is set equal to the maximum number of CBR minislots available in one channel[i] MAP message (e.g., 60 minislots), minus the grant size G of minislots required for servicing the CBR request (e.g., 4 minislots). Thus, in the specific example described above, the MAX_GRANT_OFFSET value will be set equal to 60−4=56. Thus, if the bits in the GRANT_MASK have been shifted more than 56 times, the currently selected set of linked lists (used to build the ALLOC_VACANCY MAP) are not able to support a CBR grant of size G. Accordingly, at 1125, the START_LIST_INDEX value is incremented by one. This has the effect shifting the lists selected for constructing the ALLOC_VACANCY MAP. In the example above, with the START_LIST_INDEX=0, lists L0, L2, L4, L6, L8, L10 are selected. However, with the START_LIST_INDEX=1, lists L1, L3, L5, L7, L9, L11 are selected.

At 1126, a determination is made whether the START_LIST_INDEX value is greater than or equal to the LIST_OFFSET value. Once the START_LIST_INDEX value is at least equal to the LIST_OFFSET value, it is presumed that all possible list combinations have been checked for available minislots for servicing the CBR service request. Accordingly, at 1128, a value of "FALSE" is returned to the procedure which called the UGS Admission Control procedure 1100, indicating that the CBR service request is not able to be admitted by admission control.

If, however, the START_LIST_INDEX value is not equal to or greater than the LIST_OFFSET value, then the Admission Control procedure 1100 is repeated starting at 1106, using a new set of selected linked lists which are derived from the new START_LIST_INDEX value.

Returning to block 1124, if the GRANT_OFFSET value is not greater than the MAX_GRANT_OFFSET value, then the bits of the GRANT_MASK are shifted one bit to the right (1122), and the newly shifted GRANT_MASK field is again logically ANDed with the ALLOC_VACANCY map as described at 1114.

It will be appreciated by those skilled in the art that the selected direction for shifting the bits in the GRANT_MASK (e.g., to the right or to the left) will depend upon how the GRANT_MASK is initialized. For example, in specific embodiments where the GRANT_MASK is implemented as an integer having a consecutive number of 1's in the least most significant bits of the integer, with the remainder bits being all 0's, the bits in the GRANT_MASK will be shifted one bit to the left during Admission Control procedure 1100. Such alternate embodiments may be implemented by one having ordinary skill in the art.

FIG. 8 shows an example of how the bits of the GRANT_MASK are shifted in order to find an available location in each of the selected linked lists for inserting a grant allocation of minislots for servicing a particular CBR service request. GRANT_MASK 804a shows an example of a CBR grant request having a grant size of four minislots, which has already been shifted 12 bits to the right using procedure 1100 of FIG. 11A. The result of performing a logical AND operation between GRANT_MASK 804a and the ALLOC_VACANCY MAP 802 is non-zero, as shown at 806a of FIG. 8. Accordingly, each of the bits and the GRANT_MASK are shifted one bit to the right, thereby producing the GRANT_MASK identified at 804b.

GRANT_MASK 804b is then logically ANDed with ALLOC_VACANCY MAP 802, producing a non-zero result as shown at 806b. In response, the bits of the GRANT_MASK are again shifted one bit to the right, thereby producing the GRANT_MASK shown in 804c.

When the GRANT_MASK of 804c is logically ANDed with ALLOC_VACANCY field 802, a result of 0 is achieved, as shown at 806c. This, in turn, means that each of the selected linked lists (L0, L2, L4, L6, L8, L10) has respective minislots 14, 15, 16, 17, available to be allocated for servicing the CBR service request. At this point, control is passed to the CBR Grant Allocation procedure 1200 (FIG. 12) for allocating the appropriate minislots to service the CBR service request.

FIG. 12 shows a flow diagram of specific embodiment of a CBR Grant Allocation procedure 1200 which may be used for implementing grant allocations in each of the linked lists of list array 500 (FIG. 5). When the Grant Allocation procedure 1200 is called, it is passed a number of initial input parameters, as specified at 1202. These input parameters have been described in detail in earlier portions of this application.

At 1204, the list pointer address is configured to point to the particular linked list array 500 associated with the particular channel[i] for the modem making the CBR service request.

At 1206, a for-each loop is initiated in a manner similar to that described above with respect to FIG. 11D. At 1208, a variable k is generated which will be used as an indexed value for selecting the particular linked list for inserting a grant allocation element related to the CBR service request. A more detailed explanation of the expression at block 1208 is provided in the discussion with respect to block 1112b of FIG. 11D.

Figure 7A:
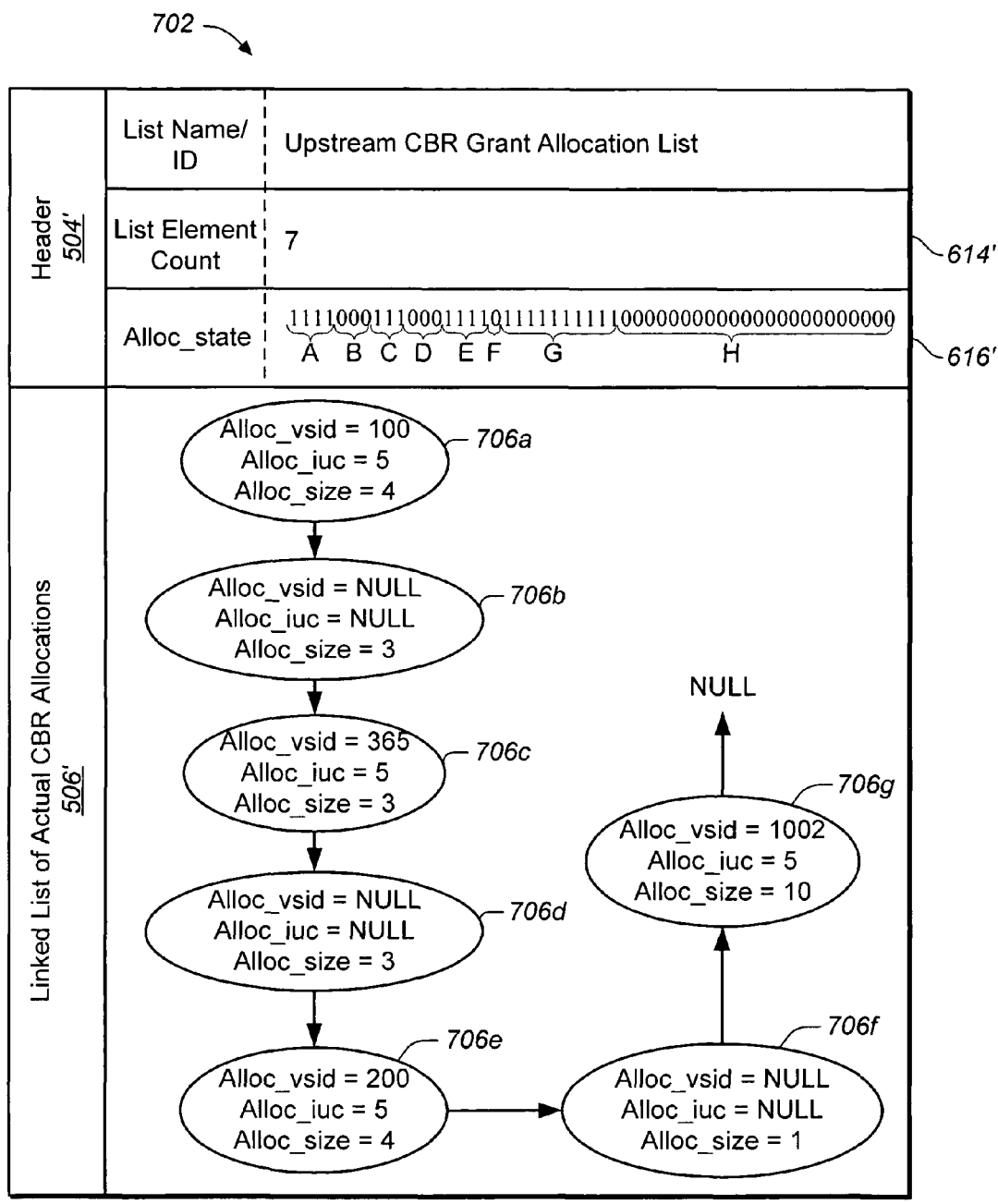
FIG. 7A show a schematic block diagram of an example of how linked list 502 of FIG. 7 may be modified in accordance with the technique of the present invention.

At 1210, the ALLOC_STATE map of a particular one of the selected linked lists is modified to include a bit representation of the minislots which are allocated for servicing the new CBR grant element. In a specific embodiment, this modification is achieved by performing a logical OR operation between the ALLOC_STATE map and the GRANT_MASK (i.e., the GRANT_MASK which produced a result of zero at block 1114 of FIG. 11A). An example of how the ALLOC_STATE field 616 of a selected linked list is modified to include a bit representation of the newly admitted CBR grant allocation is illustrated in FIGS. 7 and 7A. In order to update the ALLOC_STATE field 616 of FIG. 7, GRANT_MASK 804c (FIG. 8) will be logically ORed with ALLOC_STATE MAP 616 (FIG. 7), thereby producing a new ALLOC_STATE MAP 616' as shown in FIG. 7A.

At 1212, the list of linked grant allocation elements for linked list[k] is walked through to find the closest neighboring grant element in the list having an offset value less than GRANT_OFFSET. Thus, for example, using the example of FIG. 8, the GRANT_OFFSET value for GRANT_MASK 804c is 14. Using the linked list 502 of FIG. 7 as an example, the Grant Allocation procedure 1200 walks through the linked list of CBR grant allocations 506, and searches for the closest neighboring grant element having an offset less than 14. The value of the offset is calculated, for example, by summing the values of each alloc_size field in each of the grant elements. Thus, in the example of FIG. 7, the closest grant allocation element having an offset less than 14 is element 506c.

The Grant Allocation procedure 1200 then inserts a new CBR grant element after the closest neighboring list grant element (1214). The new CBR grant element will include a VSID value, a IUC value, and a grant size or alloc_size value. In the example of FIG. 7, this new CBR grant element would be inserted after grant element 506c.

After the new CBR grant element has been inserted into the respective linked list, list element padding around the new CBR grant element is either added or updated to maintain zero for jitter neighboring CBR grants within that linked list (1216, FIG. 12). An example of how a new CBR grant element is inserted into a particular linked list is shown in FIG. 7A of the drawings.

FIG. 7A illustrates an example of how the linked list 502 of FIG. 7 is modified to include a new CBR grant allocation element and associated padding elements in accordance with the CBR Grant Allocation procedure 1200 of FIG. 12.

As shown in FIG. 7A, the new CBR grant allocation element is represented by 706e. In order to keep the allocated minislots for grant elements 706c and 706g in their same relative positions, new padding elements 706d and 706f are introduced into the linked list 702. Assuming, for example, that the corresponding minislots allocated for grant element 706e are minislots 14-17, a padding element 706d is introduced between grant 706c and 706e for inserting a string of three zeros between these two grant allocation elements. Alternatively, the padding element 506d of FIG. 7 may be modified by modifying its associated alloc_size field, thereby producing padding element 706d of FIG. 7A. Additionally, in order to ensure that grant element 706g maintains zero jitter by utilizing the same respective minislots as it did prior to the insertion of grant element 706e, a new padding element 706f is introduced.

Once the new CBR grant element and appropriate padding element(s) have been added or inserted into the linked list of CBR allocations, the value of the list element count field or register (614, FIG. 7) is adjusted to reflect the current number of allocation elements within that linked list (1218, FIG. 12).

Returning to FIG. 12, after a new CBR grant element has been inserted into a selected linked list in accordance with the Grant Allocation procedure 1200, the same CBR grant allocation element is inserted into the other selected linked list in the same manner as described above.

Once the appropriate CBR grant allocation element(s) for servicing the new CBR request have been inserted into each of the selected linked list(s), the cable modem making the CBR grant request will be notified of the admission control success, and will be provided with the VSID value that was used for the newly admitted CBR allocation. The cable modem then waits for the next channel MAP message which will specify a number of G minislots allocated to the particular cable modem associated with that VSID.

When the cable modem completes its call or other CBR related tasks, it notifies the CMTS, whereupon the system deletes all grant allocation elements associated with that particular VSID in any of the appropriate linked lists. Additionally, after a specific CBR grant allocation element has been deleted from a selected linked list, in a specific embodiment of the present invention, the padding elements (if any) straddling the deleted CBR grant allocation element are consolidated into a single padding element. By consolidating the padding elements, memory resources in the system may be conserved.

Alternatively, in a specific embodiment where processing speed is more important than conservation of memory resources, each linked list may be implemented with N allocation elements (either actual CBR grants or padding elements), wherein N represents the number of CBR minislots allocated for a particular channel[i] MAP message. In this specific embodiment, the number of grant allocation elements for each list will remain fixed, however, the purpose or use of each element will continually change. For example, using the ALLOC_STATE field 616 of FIG. 7 as an example, the first four grant allocation elements will specify an Alloc_VSID=100, an Alloc_IUC=5, and an Alloc_SIZE=1. These four grant allocation elements, together, represent element 506a of FIG. 7. Similarly, element 506b of FIG. 7 may be represented by three individual grant allocation elements, each having a NULL alloc_VSID and alloc_IUC field, and each having an alloc_size=1. One advantage of this latter embodiment of the present invention is that processing time for the Admission Control procedure may be reduced since the addition, deletion, and/or consolidation of padding elements may be avoided.

Using the plurality of linked lists 500 for a particular upstream channel, the MAC scheduler is able to generate a plurality of grant allocation MAP messages at constant, periodic intervals to the cable modems on that particular upstream channel. In generating each MAP message using a particular linked list, the MAC scheduler walks through each of the list elements, and assigns minislot allocations based upon the data contained within each allocation element. For example, in the example of FIG. 5, list array 500 includes 12 linked lists (L0-L11). Each linked list 502 is used by the MAC scheduler for generating the CBR portion of a respective channel MAP message. Thus, in the example of FIG. 5, 12 individual channel MAP messages will be created using the 12 linked lists within list array 500. On the 13$^{th}$ MAP message, the MAC scheduler will return to the first list within list array 500, and again use lists L0-L11 to generate the respective CBR portions of MAP messages 13-24. In this way, the plurality of linked lists within list array 500 may be used to generate a plurality of channel MAP messages at constant, periodic intervals. Any changes or modifications to any of the allocation elements in any of the linked lists within list array 500 will automatically be implemented by the MAP scheduler and incorporated into subsequent MAP messages generated from the particular linked list which has been modified.

It will be appreciated by one having ordinary skill in the art that the technique of the present invention may be implemented in any computer network having a standardized protocol for utilizing a central termination system (e.g. head end) to schedule time slots for remote stations or nodes on a return (or upstream) channel. In wireless networks, the central termination system may be referred to as a head end or wireless base station. In satellite networks, the central termination system may be referred to as a master controlling station.

Figure 13:
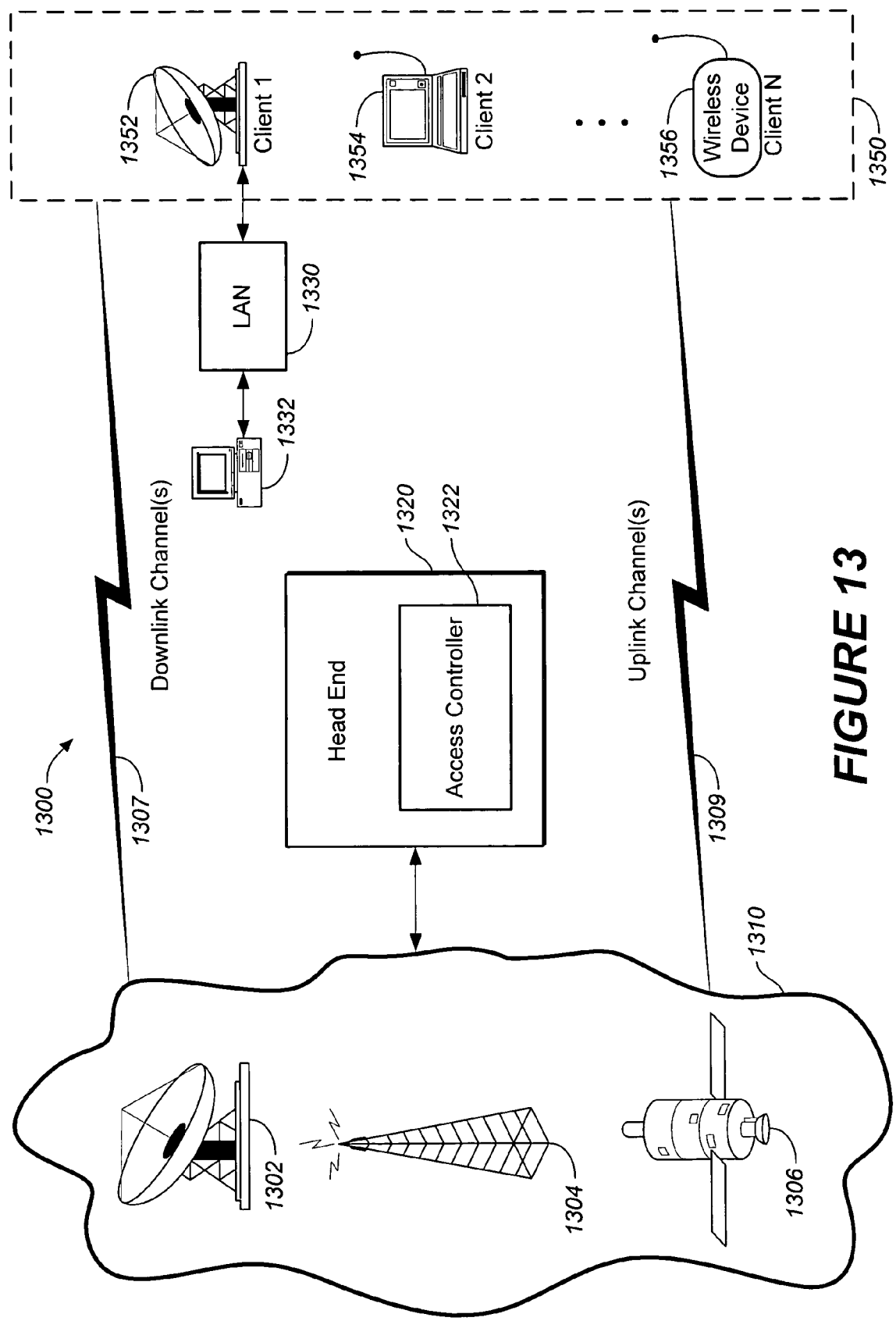
FIG. 13 shows a schematic block diagram of a wireless network which may be implemented using technique of the present invention.

FIG. 13 shows an alternate embodiment of the present invention wherein constant bit rate (CBR) service is provided to a plurality of nodes over a wireless or satellite computer network using the various techniques of the present invention described above.

As shown in FIG. 13, the wireless system includes a central termination system (or head end) 1320. The head end includes an access controller or access control system (ACS) 1322 which communicates with a plurality of wireless nodes 1350, and coordinates access between each of the wireless nodes and the head end 1320. The access controller 1322 may include memory and at least one processor. In a specific embodiment, the function of the access controller 1322 is analogous to that of the CMTS described above with respect to cable modem networks.

The head end 1320 communicates with a plurality of wireless nodes 1350 via any one of a plurality of wireless transmitting and receiving devices 1310. As shown in FIG. 13, for example, the plurality of wireless transmitting and receiving devices 1310 may include satellite base stations 1302, orbital satellites 1306, radio towers 1304, etc.

As is commonly known to those skilled in the art, two conventional techniques may be used for achieving multiple access of wireless nodes to the head end in a wireless network. The first technique utilizes a time division multiple access (TDMA), wherein each wireless node is granted a time slot for communicating with the central termination system or head end. Alternatively, a code division multiple access technique (CDMD) may be utilized, wherein each node is assigned a specific key or code for transmitting data to the head end. The data sent by each node to the head end is then scrambled according to its respective key or code. Regardless of the technique which is used for achieving shared access to the head end in a wireless network, the technique of the present invention may be used for implementing constant bit rate or unsolicited grant service to the plurality of nodes in the network.

In a specific embodiment which is analogous to that of cable modem networks, the head end 1320 of the wireless computer system communicates with the plurality of nodes 1350 via one or more downlink channels 1307 and one or more uplink channels 1309. Each downlink channel 1307 is a broadcast-type channel utilized by the head end to communicate with an associated group of wireless nodes within the wireless network. The uplink channel 1309 is a shared-access channel which is utilized by a group of wireless nodes to communicate with the head end 1320.

The access controller 1322 includes a scheduler for generating a plurality of channel MAP messages which are broadcast on the downlink channel to the group of nodes 1350. In a specific embodiment of the present invention, the channel MAP messages generated by access controller 1322 contain information analogous or similar to the information contained within the cable modem MAP messages described previously. More specifically, the access controller 1322 may utilize the uplink channel MAP messages to schedule various slot-types on the upstream or uplink channel 1309, including, for example, initial maintenance slots, periodic maintenance slots, broadcast request minislots, unicast request polls, data grants, etc.

In a specific embodiment of the present invention, the format of the MAP messages of wireless system 1300 (FIG. 13) is identical to the format of the cable modem MAP messages described above. Moreover, the technique of the present invention for scheduling CBR grant requests using a plurality of linked lists of grant allocation elements may be implemented in wireless system 1300 by one having ordinary skill in the art.

The wireless devices or nodes 1350 may include any one of a number of wireless transmitting/receiving devices. For example, a satellite dish 1352 may be used to communicate with the head end 1320 via the uplink and downlink channels. The satellite dish may, in turn, be connected to a local area network (LAN) 1330 which, may be further connected to one or more computer systems 1332. Another wireless device may be a portable/wireless computer system 1354 which is able to transmit and receive information to the head end via uplink and downlink channels 1307 and 1309. Other wireless devices 1356 may include, for example, wireless telephones, handheld computing devices, etc.

In specific embodiments where the uplink and downlink channels within the wireless system 1300 are utilized in a manner similar to that of the upstream and downstream channels of a cable modem network, the above-described technique for implementing channel MAP messages and for scheduling or servicing CBR grant request may easily be implemented in wireless system 1300 by one having ordinary skill in the art using the detailed description of the present invention provided in this application. Moreover, the technique of the present invention may be easily implemented in any computer network which uses at least one shared access type time-slotted channel for communicating between a centralized computing system and one or more remote nodes.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A method comprising:
   receiving a constant bit rate (CBR) service request at a cable modem network Head End, said CBR service request received from a node on a shared access channel, said CBR service request comprising a request to periodically transmit to said Head End a packet of p bytes;
   evaluating whether said CBR service request can be admitted; and
   in response to a determination that said CBR service request can be admitted, allocating a plurality of unsolicited grants for said node at predetermined, constant, periodic intervals, to thereby provide CBR service to said node,
   wherein said allocating includes providing a plurality of grant allocation MAP messages to said nodes at constant, periodic intervals, wherein the grant allocation MAP messages have a modified format, each grant allocation MAP message configured to have a first predetermined number N of minislot allocations reserved primarily for CBR purposes, and a second predetermined number M of minislot allocations reserved primarily for other purposes, wherein the minislot allocations reserved primarily for CBR purposes may be used for other purposes if not being used for CBR purposes, and wherein said grant allocation MAP messages provide information to nodes on said channel relating to ownership and types of minislots on said shared access channel which are to be used by said nodes to communicate with the Access Control System (ACS).

2. The method of claim 1 wherein said allocating further includes allocating, at constant, periodic intervals, a predetermined number of G minislots on said shared access channel for each unsolicited grant allocated for said node.

3. The method of claim 1 wherein a total time length of reserved minislots in one grant allocation MAP message measures about 5 milliseconds, and wherein a total time length of said first predetermined number of CBR minislots measures about 3 milliseconds, and wherein a total time length of said second predetermined number of other minislots measures about 2 milliseconds.

4. The method of claim 1 wherein said allocating includes providing at least one linked list of grant allocation elements relating to CBR service requests by nodes on said channel, each of said elements including a Service ID (SID) field for identifying a particular node associated with each respective grant element, and a grant size (G) field for indicating a grant size of each respective grant element.

5. The method of claim 1 wherein said allocating includes providing at least one linked list of CBR grant allocation elements used for generating periodic grant allocation MAP messages, said linked list including a header comprising a first bit representation of an allocation status of each of said CBR minislots of a respective, periodically generated MAP message, said allocation status indicating one of at least two minislot status states including a reserved state and a vacant state.

6. The method of claim 5 wherein said first bit representation of CBR minislot allocations is implemented as an ALLOC_STATE field.

7. The method of claim 5 wherein said first bit representation of CBR minislot allocations comprises a plurality of at least N bits, wherein each of said N bits in said first bit representation of CBR minislot allocations represents an allocation status of a respective minislot of said CBR minislots.

8. The method of claim 7 wherein said first bit representation of CBR minislot allocations is implemented as a 64-bit unsigned integer, 60 bits of which represent 60 CBR minislots in said periodically generated grant allocation MAP message.

9. The method of claim 5 wherein said at least one linked list includes j linked lists of grant allocation elements, each of said lists corresponding to a respective, periodically generated MAP message, each of said lists including a respective first bit representation of CBR minislot allocations, and wherein said evaluating includes implementing a second bit representation of a compiled allocation status of selected first bit representations of CBR minislot allocations from selected linked lists.

10. The method of claim 9 wherein said second bit representation of said compiled status of CBR minislot allocations is implemented as an ALLOC_VACANCY field.

11. The method of claim 9 wherein each of said selected first bit representations of CBR minislot allocations comprises a respective plurality of N bits, and wherein each bit in each first bit representation of CBR minislot allocations represents an allocation status of a respective minislot of said CBR minislots, and wherein said implementing includes performing a logical OR operation on each of said selected first bit representations of CBR minislot allocations to thereby generate a value for said second bit representation of said compiled status of minislot allocations.

12. The method of claim 9 further including using said j linked lists of grant allocations to generate at least j grant allocation MAP messages, whereby grant allocations elements in each of said linked lists are converted to minislot allocations in each of said MAP messages.

13. The method of claim 1 wherein said evaluating includes computing a grant time interval T, and a grant size G of a number of minislots needed to service said request every T milliseconds.

14. The method of claim 1 wherein said network is a wireless network, and wherein said plurality of nodes are wireless nodes.

15. The method of claim 1 wherein said network is a cable modem network, wherein said plurality of nodes are cable modems, and wherein said ACS includes a Cable Modem Termination System (CMTS).

16. A system for providing constant bit rate (CBR) service over a computer network, the network including a Head End and a plurality of nodes, the network further including at least one shared access channel utilized by at least a portion of said plurality of nodes to communicate with said Head End, said network further including at least one downstream channel utilized by said Head End to communicate with said portion of nodes, the system comprising:

an Access Control System (ACS) in communication with said Head End for coordinating node access to said Head End, said ACS having memory and at least one processor;

said ACS being configured or designed to receive a CBR service request from a node on a particular shared access channel, said CBR service request comprising a request to periodically transmit a packet of p bytes;

said ACS further being configured or designed to evaluate whether said CBR service request can be admitted; and wherein said ACS is further configured or designed to allocate a plurality of unsolicited grants for said node at predetermined, constant, periodic intervals, in response to a determination that said CBR service request can be admitted, to thereby provide CBR service to said node, wherein said ACS is further configured or designed to provide a plurality of grant allocation MAP messages to said nodes at constant, periodic intervals, wherein the grant allocation MAP messages have a modified format, each grant allocation MAP message configured to have a first predetermined number N of minislot allocations reserved primarily for CBR purposes, and a second predetermined number M of minislot allocations reserved primarily for other purposes, wherein the minislot allocations reserved primarily for CBR purposes may be used for other purposes if not being used for CBR purposes, and wherein said grant allocation MAP messages provide information to nodes on said channel relating to ownership and types of minislots on said shared access channel which are to be used by said nodes to communicate with the Head End.

17. The system of claim 16 wherein a total time length of reserved minislots in one grant allocation MAP message measures about 5 milliseconds, and wherein a total time length of said first predetermined number of CBR minislots measures about 3 milliseconds, and wherein a total time length of said second predetermined number of other minislots measures about 2 milliseconds.

18. The system of claim 16 wherein said ACS is further configured or designed to provide at least one linked list of grant allocation elements relating to CBR service requests by nodes on said channel, each of said elements including a Service ID (SID) field for identifying a particular node associated with each respective grant element, and a grant size (G) field for indicating a grant size of each respective grant element.

19. The system of claim 16 wherein said ACS is further configured or designed to provide at least one linked list of CBR grant allocation elements used for generating periodic grant allocation MAP messages, said linked list including a header comprising a first bit representation of an allocation status of each of said CBR minislots of a respective, periodically generated MAP message, said allocation status indicating one of at least two minislot status states including a reserved state and a vacant state.

20. The system of claim 19 wherein said first bit representation of CBR minislot allocations is implemented as an ALLOC_STATE field.

21. The system of claim 19 wherein said at least one linked list includes j linked lists of grant allocation elements, each of said lists corresponding to a respective, periodically generated MAP message, each of said lists including a respective first bit representation of CBR minislot allocations.

22. The system of claim 21 wherein said ACS is further configured or designed to provide a second bit representation of said compiled status of minislot allocations representing a compiled allocation status of selected first bit representations of CBR minislot allocations from selected linked lists.

23. The system of claim 22 wherein each of said selected first bit representations of CBR minislot allocations comprises a respective plurality of N bits, each bit in each first bit representation of CBR minislot allocations representing an allocation status of a respective minislot of said CBR minislots, and wherein said second bit representation of said compiled status of minislot allocations comprises N bits, each bit in said second bit representation of said compiled status of minislot allocations representing a result of a logical OR operation between corresponding bits of each of said selected first bit representations of CBR minislot allocations.

24. The system of claim 21 wherein said ACS is further configured or designed to provide use said j linked lists of grant allocations to generate at least j grant allocation MAP messages, whereby grant allocations elements in each of said linked lists are converted to minislot allocations in each of said MAP messages.

25. The system of claim 16 wherein said ACS is further configured or designed to compute a grant time interval T, and a grant size G of a number of minislots needed to service said request every T milliseconds.

26. The method of claim 16 wherein said network is a wireless network, and wherein said plurality of nodes are wireless nodes.

27. The system of claim 16 wherein said network is a cable modem network, wherein said plurality of nodes are cable modems, and wherein said ACS includes a Cable Modem Termination System (CMTS).

28. A non-transitory computer readable medium having computer code embodied therein, the computer readable medium comprising:
- computer code for receiving a CBR service request from a node on a shared access channel, said node connected to a Head End through an Access Control System (ACS), said CBR service request comprising a request to periodically transmit a packet of p bytes;
- computer code for evaluating whether said CBR service request can be admitted; and
- computer code for allocating a plurality of unsolicited grants for said node at predetermined, constant, periodic intervals, in response to a determination that said CBR service request can be admitted, to thereby provide CBR service to said node; and
- computer code for providing a plurality of grant allocation MAP messages to said nodes at constant, periodic intervals, wherein the grant allocation MAP messages have a modified format, each grant allocation MAP message configured to have a first predetermined number N of minislot allocations reserved primarily for CBR purposes, and a second predetermined number M of minislot allocations reserved primarily for other purposes, wherein the minislot allocations reserved primarily for CBR purposes may be used for other purposes if not being used for CBR purposes, and wherein said grant allocation MAP messages provide information to nodes on said channel relating to ownership and types of minislots on said shared access channel which are to be used by said nodes to communicate with the ACS.

29. The non-transitory computer readable medium of claim 28 wherein said linked list includes including a header comprising a first bit representation of an allocation status of each of said CBR minislots of a respective, periodically generated MAP message, said allocation status indicating one of at least two minislot status states including a reserved state and a vacant state.

30. A system comprising:
- means for receiving a constant bit rate (CBR) service request at a cable modem network Head End, said CBR request received from a node on a shared access channel, said CBR service request comprising a request to periodically transmit to said Head End a packet of p bytes;
- means for evaluating whether said CBR service request can be admitted;
- means for determining that said CBR service request can be admitted;
- means for allocating a plurality of unsolicited grants for said node at predetermined, constant, periodic intervals, to thereby provide CBR service to said node,
- wherein said allocating includes providing a plurality of grant allocation MAP messages to said nodes at constant, periodic intervals, where the grant allocation MAP messages have a modified format, each grant allocation MAP message configured to have a first predetermined number N of minislot allocations reserved primarily for CBR purposes, and a second predetermined number M of minislot allocations reserved primarily for other purposes, wherein the minislot allocations reserved primarily for CBR purposes may be used for other purposes if not being used for CBR purposes, and wherein said grant allocation MAP messages provide information to nodes on said channel relating to ownership and types of minislots on said shared access channel which are to be used by said nodes to communicate with the Head End.

* * * * *